United States Patent [19]
Schoenbach et al.

[11] Patent Number: 5,939,829
[45] Date of Patent: Aug. 17, 1999

[54] DISCHARGE DEVICE HAVING CATHODE WITH MICRO HOLLOW ARRAY

[75] Inventors: Karl H. Schoenbach, Norfolk, Va.; Wojciech W. Byszewski, Boston, Mass.; Frank E. Peterkin, Norfolk; Amin N. Dharamsi, Virginia Beach, both of Va.

[73] Assignee: Osram Sylvania, Inc., Danvers, Mass.

[21] Appl. No.: 08/901,195

[22] Filed: Jul. 28, 1997

Related U.S. Application Data

[62] Division of application No. 08/403,477, Mar. 14, 1995, Pat. No. 5,686,789.

[51] Int. Cl.⁶ .................................................. H01J 61/06
[52] U.S. Cl. ........................... 313/632; 313/491; 313/618; 313/574
[58] Field of Search ..................... 313/605, 491, 313/574, 575, 576, 618, 631, 632, 348, 349, 619, 346 DC; 428/690

[56] References Cited

U.S. PATENT DOCUMENTS

| 1,842,215 | 1/1932 | Thomas . | |
|---|---|---|---|
| 2,087,735 | 7/1937 | Pirani | 176/122 |
| 2,549,355 | 4/1951 | Winninghoff | 176/122 |
| 2,812,465 | 11/1957 | Germeshausen | 313/207 |
| 2,847,605 | 8/1958 | Byer | 313/346 |
| 2,941,107 | 6/1960 | Nolle | 313/185 |
| 3,196,043 | 7/1965 | Harris et al. | 117/212 |
| 3,304,456 | 2/1967 | DeLany et al. | 313/182 |
| 3,383,541 | 5/1968 | Ferreira | 313/207 |
| 3,390,297 | 6/1968 | Vollmer | 313/209 |
| 3,505,553 | 4/1970 | Piree | 313/107 |
| 3,515,932 | 6/1970 | King | 313/479 |
| 3,662,214 | 5/1972 | Lustig | 315/167 |

(List continued on next page.)

FOREIGN PATENT DOCUMENTS

| 0 210 858 | 2/1987 | European Pat. Off. . |
|---|---|---|
| 417 470 A2 | 3/1991 | European Pat. Off. . |
| 5 275 061 | 10/1993 | Japan . |

OTHER PUBLICATIONS

A.D. White, "New Hollow Cathode Glow Discharge", J. Applied Physics, vol. 30, No. 5, May, 1959, pp. 711–719.
G. Schaefer et al, "Basic Mechanisms Contributing to the Hollow Cathode Effect", Physics & Applications of Pseudosparks, Plenum Press, New York, 1990, pp. 55–76.
M.T. Ngo et al, "The Temporal Development of Hollow Cathode Discharges", IEEE Trans. On Plasma Science, vol. 18, No. 3, Jun. 1990, pp. 669–676.
M.A. Mantenieks et al, "Preliminary Test Results of a Hollow Cathode MPD Thruster", AIDAA/AIAA/DGLR/JSASS, 22nd Int'1. Elect. Propulsion Cnf., Oct. 1991, Viareggio, Italy.
K. H. Schoenbach, "The Effect of Magnetic Fields on Hollow Cathode Discharges", Proceedings III, 21st Int. Conf. On Phenomena in Ionized Gases (ICPIG), Bochun, Germany, Sep. 1993, vol. 3, p. 287.
K.H. Schoenbach et al, "Microhollow Cathode Discharges", Applied Phys. Lett. 68(1), Jan. 1, 1996, pp. 13–15.

*Primary Examiner*—Ashok Patel
*Attorney, Agent, or Firm*—Wolf, Greenfield & Sacks, P.C.

[57] ABSTRACT

A discharge device for operation in a gas at a prescribed pressure includes a cathode having a plurality of micro hollows therein, and an anode spaced from the cathode. Each of the micro hollows has dimensions selected to produce a micro hollow discharge at the prescribed pressure. Preferably, each of the micro hollows has a cross-sectional dimension that is on the order of the mean free path of electrons in the gas. Electrical energy is coupled to the cathode and the anode at a voltage and current for producing micro hollow discharges in each of the micro hollows in the cathode. The discharge device may include a discharge chamber for maintaining the prescribed pressure. A dielectric layer may be disposed on the cathode when the spacing between the cathode and the anode is greater than about the mean free path of electrons in the gas. Applications of the discharge device include fluorescent lamps, excimer lamps, flat fluorescent light sources, miniature gas lasers, electron sources and ion sources.

11 Claims, 17 Drawing Sheets

U.S. PATENT DOCUMENTS

| | | | |
|---|---|---|---|
| 3,875,629 | 4/1975 | Kerstetter | 29/25.14 |
| 3,879,830 | 4/1975 | Buescher | 29/182.3 |
| 3,906,271 | 9/1975 | Aptt, Jr. | 313/213 |
| 3,969,279 | 7/1976 | Kern | 252/521 |
| 4,093,893 | 6/1978 | Anderson | 315/48 |
| 4,352,117 | 9/1982 | Cuomo et al. | 357/30 |
| 4,395,770 | 7/1983 | Silfvast et al. | 372/62 |
| 4,461,970 | 7/1984 | Anderson | 313/240 |
| 4,506,284 | 3/1985 | Shannon | 357/52 |
| 4,523,125 | 6/1985 | Anderson | 313/491 |
| 4,553,063 | 11/1985 | Geibig et al. | 313/325 |
| 4,574,216 | 3/1986 | Hoeberechts et al. | 313/444 |
| 4,698,546 | 10/1987 | Maitland et al. | 313/618 X |
| 4,717,855 | 1/1988 | Zwier et al. | 313/409 |
| 4,795,942 | 1/1989 | Yamasaki | 313/618 |
| 4,825,446 | 4/1989 | Maitland et al. | 372/87 |
| 4,853,754 | 8/1989 | Van Gorkom et al. | 357/16 |
| 5,043,627 | 8/1991 | Fox | 313/491 |
| 5,063,324 | 11/1991 | Grunwald | 313/632 X |
| 5,185,556 | 2/1993 | Yagi et al. | 313/637 |
| 5,331,249 | 7/1994 | Minamikata et al. | 313/632 |
| 5,343,115 | 8/1994 | Anandan et al. | 313/491 |
| 5,359,257 | 10/1994 | Bunch et al. | 313/310 |
| 5,408,160 | 4/1995 | Fox | 313/491 X |

DISCHARGE DEVICE HAVING CATHODE WITH MICRO HOLLOW ARRAY

This application is a division of application Ser. No. 08/403,477, filed Mar. 14, 1995, entitled DISCHARGE DEVICE HAVING CATHODE WITH MICRO HOLLOW ARRAY and now U.S. Pat. No. 5,686,789.

FIELD OF THE INVENTION

This invention relates to gas discharge devices and, more particularly, to gas discharge devices which utilize a cathode having a micro hollow array.

BACKGROUND OF THE INVENTION

The general concept of a discharge device which utilizes a hollow cathode for increased current capability is disclosed in the prior art. A hollow cathode glow discharge utilizing a single, nearly spherical hollow cathode is described by A. D. White in *Journal of Applied Physics*, Vol. 30, No. 1, May 1959, pp. 711–719. The author reported a stable discharge and negligible deterioration from sputtering. The basic mechanisms contributing to the hollow cathode effect are described by G. Schaefer et al. in *Physics and Applications of Pseudosparks*, Ed. by M. A. Gundersen and G. Schaefer, Plenum Press, New York, 1990, pp. 55–76. Measurements of the temporal development of hollow cathode discharges are described by M. T. Ngo et al. in *IEEE Transactions on Plasma Science*, Vol. 18, No. 3, June 1990, pp. 669–676.

A variety of hollow cathode structures for fluorescent lamps have been disclosed in the prior art. A directly-heated hollow cathode having an interior coating of an emissive material is disclosed in U.S. Pat. No. 4,523,125, issued Jun. 11, 1985 to Anderson. A shielded hollow cathode for fluorescent lamps is disclosed in U.S. Pat. No. 4,461,970, issued Jul. 24, 1984 to Anderson. A hollow electrode having an interior coating of an emissive material that varies in thickness is disclosed in U.S. Pat. No. 2,847,605, issued Aug. 12, 1958 to Byer. A short arc fluorescent lamp having hollow cathode assemblies is disclosed in U.S. Pat. No. 4,093,893, issued Jun. 6, 1978 to Anderson. Cup shaped electrodes containing emissive material for use in cold cathode fluorescent lamps are disclosed in U.S. Pat. No. 3,906,271, issued Sep. 16, 1975 to Aptt, Jr., and U.S. Pat. No. 3,969,279, issued Jul. 13, 1976 to Kern. A fluorescent lamp wherein a filament is positioned within a cylindrical shield is disclosed in U.S. Pat. No. 2,549,355, issued Apr. 17, 1951 to Winninghoff. Additional hollow cathode discharge devices are disclosed in U.S. Pat. No. 1,842,215, issued Jan. 19, 1932 to Thomas; U.S. Pat. No. 3,515,932, issued Jun. 2, 1970 to King; U.S. Pat. No. 4,795,942, issued Jan. 3, 1989 to Yamasaki; U.S. Pat. No. 3,390,297, issued Jun. 25, 1968 to Vollmer; and U.S. Pat. No. 3,383,541, issued May 14, 1968 to Ferreira.

An electrical discharge electrode including a plurality of tubes, which are filled with an electron emissive material and embedded in a metallic matrix, is disclosed in U.S. Pat. No. 4,553,063, issued Nov. 12, 1985 to Geibig et al.

A variety of different fluorescent lamp types have been developed to meet different market demands. In addition to conventional tubular fluorescent lamps for office and commercial applications, compact fluorescent lamps have been developed as incandescent lamp replacements. Subminiature fluorescent lamps have found applications in displays and general illumination in limited spaces.

Different fluorescent lamps may operate under very different discharge conditions. The small size of subminiature fluorescent lamps may not allow for hot cathode operation, thus requiring efficient cold cathode emitters. The buffer gas pressure in subminiature fluorescent lamps is often on the order of 100 torr in order to limit electron loss to the lamp wall. By contrast, conventional fluorescent lamps typically utilize pressures on the order of 0.5–2.0 torr. Environmental concerns have necessitated the investigation of lamp fill materials other than mercury. In mercury-free fluorescent lamps, radiation is often produced by excimers of inert gases, such as neon, argon and xenon. In order to form excimers, a gas pressure of approximately 100 torr is required. In subminiature fluorescent lamps utilizing cold cathodes, the operating life may be limited by sputtering. In addition, current limitations may restrict light output. These trends have produced a need for improved cathode configurations.

The hollow cathode configurations disclosed in the prior art are not suitable for use in subminiature fluorescent lamps because of their relatively large sizes and because of the relatively high pressures utilized in subminiature fluorescent lamps.

Hollow cathodes have been studied in connection with other applications, such as excitation sources for gas lasers, ion sources, plasma jets, electron beams and plasma switches. In each case, a cathode with a single, relatively large opening, or hollow, has been studied at low (subtorr) pressure.

SUMMARY OF THE INVENTION

According to the invention, a discharge device for operation in a gas at a prescribed pressure comprises a cathode and an anode spaced from the cathode, and electrical means for coupling electrical energy to the cathode and the anode. The cathode comprises a conductor having a plurality of micro hollows therein. Each of the micro hollows has cross-sectional dimensions selected to support a micro hollow discharge at the prescribed pressure. Electrical energy is coupled to the cathode and the anode at a voltage and current for producing micro hollow discharges in each of the micro hollows in the cathode.

Each of the micro hollows preferably has a cross-sectional dimension that is on the order of the mean free path of electrons in the gas. Under these conditions, electrons undergo oscillatory motion within the micro hollows and produce substantially higher currents than a planar cathode. The micro hollow discharges operate independently of each other.

The prescribed pressure for operation of the discharge device is preferably in a range of about 0.1 torr to atmospheric pressure. The discharge device may include a discharge chamber for maintaining the prescribed pressure. When the discharge device is operated at or near atmospheric pressure in air, the discharge chamber may not be required.

The discharge device may include a dielectric layer between the cathode and the anode. The dielectric layer is preferably disposed of a surface of the cathode and is provided with openings aligned with the micro hollows. The dielectric layer is preferably utilized when the spacing between the cathode and the anode is greater than about the mean free path of electrons in the gas. The dielectric layer ensures that a glow discharge between the cathode and the anode terminates in the micro hollows.

According to a first application of the discharge device, a fluorescent lamp comprises a sealed, light-transmissive tube containing a gas at a prescribed pressure, and first and second spaced-apart electrodes mounted within the tube. The first electrode comprises a conductor having a plurality of micro hollows therein. Each of the micro hollows has dimensions selected to support a micro hollow discharge at the prescribed pressure. The fluorescent lamp further includes electrical means for coupling electrical energy to the first and second electrodes at a voltage and current for producing micro hollow discharges in each of the micro hollows in the first electrode. The fluorescent lamp preferably includes a phosphor coating on the inside surface of the light-transmissive tube. The phosphor coating emits radiation having a prescribed spectrum in response to radiation generated by the discharge between the first and second electrodes. Each of the micro hollows preferably has a cross-sectional dimension that is on the order of the mean free path of electrons in the gas.

For AC operation of the fluorescent lamp, the second electrode preferably comprises a conductor having a plurality of micro hollows therein. Each of the micro hollows in the second electrode has dimensions selected to produce a micro hollow discharge at the prescribed pressure.

The fluorescent lamp preferably includes a dielectric layer on the surface of each electrode. Each dielectric layer has openings aligned with the micro hollows.

In a second application of the discharge device, a radiation source comprises a sealed discharge tube containing a gas at a prescribed pressure, first and second spaced-apart electrodes mounted within the discharge tube, and electrical means for coupling electrical energy to the first and second electrodes. At least one of the electrodes comprises a conductor having a plurality of micro hollows. Each of the micro hollows has dimensions selected to produce a micro hollow discharge at the prescribed pressure. In a preferred embodiment, the radiation source is an excimer lamp wherein the gas and the prescribed pressure are selected to emit radiation in a wavelength range of about 80 to 200 nanometers.

In a third application of the discharge device, a laser for generating laser radiation at a predetermined wavelength comprises a first mirror that is substantially reflective at the predetermined wavelength, a second mirror that is partially reflective and partially transmissive at the predetermined wavelength, a chamber for enclosing a gas at a prescribed pressure between the first and second mirrors, and a laser pumping device positioned between the first and second mirrors. The laser pumping device comprises a cathode having at least one micro hollow therein, the micro hollow having dimensions selected to produce a micro hollow discharge at the prescribed pressure, an anode spaced from the cathode and electrical means for coupling electrical energy to the cathode and the anode at a voltage and current for producing the micro hollow discharge in the micro hollow. The laser pumping device provides an unobstructed optical path along the optical axis between the first and second mirrors. The cathode may include a plurality of micro hollows and the anode may include a plurality of openings aligned with the micro hollows. In this case, each of the micro hollows defines an optical axis between the first and second mirrors for a generation of multiple laser beams at the predetermined wavelength. Two or more of the laser pumping devices may be disposed along the optical axis between the first and second mirrors.

In a fourth application of the discharge device, a light source comprises a sealed discharge chamber containing a gas at a prescribed pressure, a cathode mounted within the discharge chamber and an anode spaced from the cathode. The cathode comprises a conductor that defines an array of micro hollows. Each of the micro hollows has a cross-sectional dimension selected to support a micro hollow discharge at the prescribed pressure and has an axial dimension that is substantially less than the cross-sectional dimension. The light source further comprises electrical means for coupling electrical energy to the cathode and the anode at a voltage and current for producing micro hollow discharges in each of the micro hollows in the cathode. The light source is preferably configured as a thin, flat light source.

The light source may be configured as a flat fluorescent light source, including a phosphor coating on a light-transmissive portion of the discharge chamber. The phosphor coating emits radiation having a prescribed spectrum in response to radiation generated within the micro hollows.

In a preferred embodiment, the cathode of the flat light source comprises a wire mesh including spaced-apart conductors which define the micro hollows. Alternatively, the cathode may comprise a conductive pattern formed on a light-transmissive substrate, the conductive pattern comprising a grid of spaced-apart conductive lines.

In an additional application, the discharge device of the present invention can be configured as an electron source for generating multiple electron beams. In a further application, the discharge device is configured as an ion source for generating multiple ion beams.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
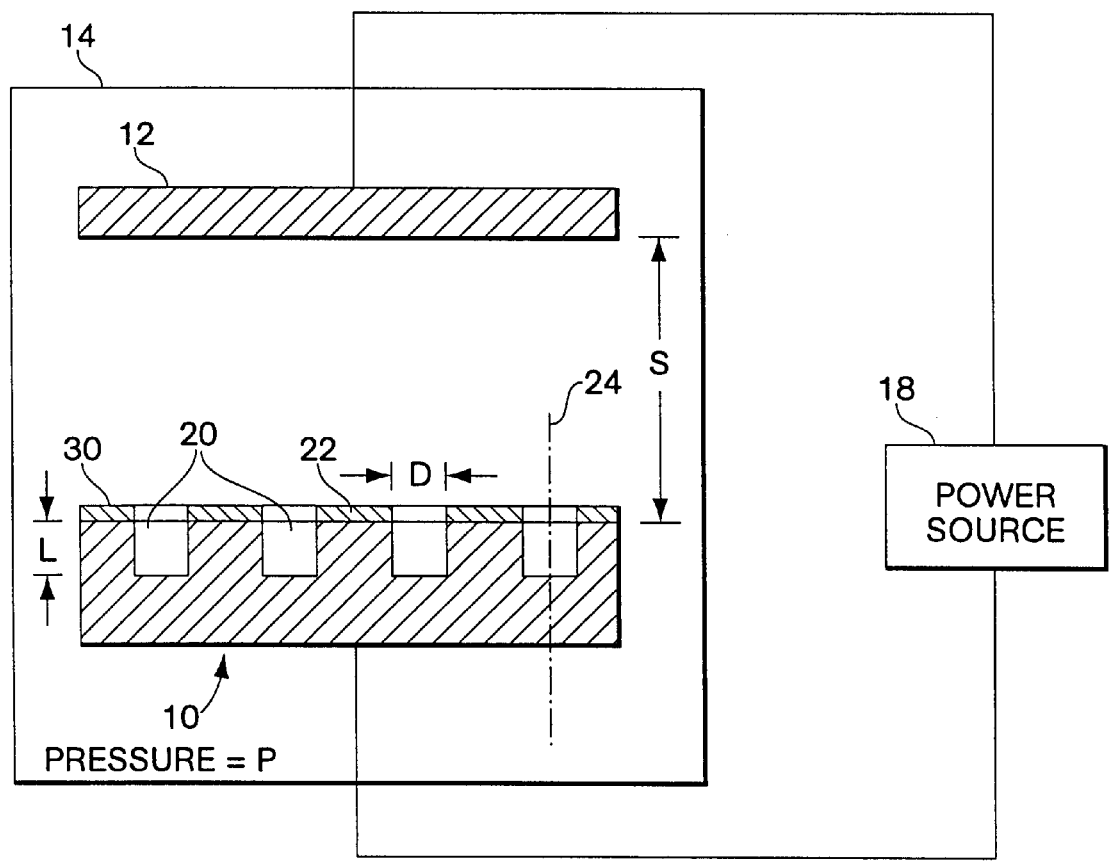
FIG. 1 is a schematic diagram of a discharge device in accordance with the present invention.

A discharge device in accordance with the present invention is shown schematically in FIG. 1. The discharge device includes a cathode 10 and an anode 12 mounted within a discharge chamber 14. The discharge chamber 14 is typically sealed and contains a gas at a prescribed pressure, P. The pressure P is typically in a range of about 0.1 torr to atmospheric pressure. In some cases, the discharge chamber 14 may have an opening to permit gas flow or to permit passage of a charged particle beam, as described below. In general, the discharge chamber 14 maintains the pressure P between anode 10 and cathode 12 within a desired range. When the discharge device is operated at atmospheric pressure in air, the discharge chamber may be omitted. A power source 18 connected to cathode 10 and anode 12 supplies electrical energy to the discharge device.

The cathode 10 comprises an electrically conductive material having one or more holes, referred to herein as micro hollows 20. Preferably, cathode 10 includes a plurality of micro hollows 20 for increased current capability. The micro hollows 20 are formed in a surface 22 of cathode 10 which may be flat or curved and which faces anode 12. Each of the micro hollows 20 has a diameter, D, and extends from surface 22 into cathode 10. As described below, the diameter D of each of the micro hollows 20 is selected to support a micro hollow discharge at the prescribed operating pressure within discharge chamber 14. The diameter D is defined as the diameter of a cross-section of the micro hollow in a plane parallel to surface 22 and perpendicular to a longitudinal axis 24 of the micro hollow 20. In some cases, the cross section of the micro hollow may not be circular. However, for ease of understanding, reference is made herein to the diameter D of the micro hollow. Where the cross section is not circular, it will be understood that the cross-sectional dimension is selected in the manner described below to support a micro hollow discharge. As shown in FIG. 1, the micro hollows 20 may be closed at one end. However, the micro hollows can be open at both ends within the scope of the present invention.

The shape of the micro hollows is not critical. The micro hollows may, for example, be formed by drilling, thus defining a generally cylindrical shape, at least initially. The micro hollows preferably have a circular cross section in a plane parallel to surface 22 of cathode 10. Alternatively, the cross section of the micro hollow can be oval, square, rectangular or slit shaped. It has been reported that the initial cylindrical shape of the micro hollow transforms itself into a spherical shape through sputtering and deposition. In cases where the micro hollow does not have a uniform diameter along the micro hollow axis 24, the diameter D is defined at surface 22. The lifetime of the micro hollow cathode is expected to be long because of low cavity erosion, due to a balance of sputtering and redeposition inside the micro hollow.

The diameter D of each of the micro hollows 20 is selected to support a micro hollow discharge within each of the micro hollows 20. More specifically, the diameter D is selected such that the cathode fall region extending from the inner wall of the micro hollow is on the order of the hole radius. The cathode fall region is defined as a region of increased electric field near the cathode surface. The intensity and distribution of the electric field is such that the ions accelerated toward the cathode gain sufficient energy to provide for emission of secondary electrons from the cathode, which are needed for a self-sustained glow discharge. The electrons emitted from the cathode surface within the micro hollow are accelerated in the cathode fall region toward the micro hollow axis 24. These electrons cross the axis and enter the cathode fall region on the opposite side of the axis, where they are reflected and accelerated across the axis again. The oscillatory motion of the so called "pendel" electrons allows them to unload most of the energy gained in the cathode fall region through exciting and ionizing collisions inside the micro hollow before drifting to the anode. The large ionization rate in a relatively small volume causes a high plasma density on the discharge axis inside the micro hollows 20 and consequently a high current. A "micro hollow discharge" occurs when electrons undergo oscillatory motion within the micro hollows. As used herein, the term "micro hollow" refers to a cathode hole having a cross-sectional diameter D in a plane parallel to the cathode surface. The hole diameter D times pressure P in the discharge chamber must be in a range of 0.1 torr-centimeter to 10 torr-centimeters, depending on the gas type, electrode material and desired mode of operation (high or low glow mode). In the discharge device of FIG. 1, the current is found to be several orders of magnitude greater than the current for a planar cathode, and the voltage is lower.

The conditions for a micro hollow discharge as described above are met when the hole diameter D is on the order of the mean free path of the electrons in the gas. The mean free path depends on the type of gas and the gas pressure in the discharge chamber 14, and is approximately equal to the dimension of the cathode fall region. Optimum micro hollow discharge conditions are obtained when the diameter D of the micro hollows is about twice the mean free path of electrons in the gas in the discharge chamber. However, it will be understood that other values of diameter D can be used within the scope of the invention. Preferably, the diameter D is in a range of about 0.1 to 10 times the mean free path of electrons in the gas, but the diameter D is not limited to this range.

The discharge parameters vary with the product of pressure P times hole diameter D. The range of P·D for which the micro hollow discharge is stable for rare gases was found to be on the order of 0.1 to 10 torr-centimeters.

It is believed that most of the micro hollow discharge current is generated in a region of the micro hollow wall that extends from the surface 22 of cathode 10 to a depth that is about three times the diameter D of the micro hollow. Thus, little additional current is obtained when the depth, L, of the micro hollow is greater than about three times the diameter D. However, a micro hollow discharge occurs even when the depth L of the micro hollow is smaller than the diameter D, with a reduction in discharge current.

The number of micro hollows 20 is selected to produce a desired total current at the operating voltage. It has been found that the micro hollows 20 can be closely spaced without adversely affecting the independent operation of the discharges.

Also shown in FIG. 1 is a dielectric layer 30 on surface 22 of cathode 10. The dielectric layer 30 is required when the spacing, S, between cathode 10 and anode 12 is greater than about the mean free path of electrons in the gas. When the spacing S exceeds this value and the dielectric layer 30 is not utilized, the glow discharge between cathode 10 and anode 12 may terminate on surface 22 of cathode 10, rather than in the micro hollows 20. Preferably, the dielectric layer 30 covers surface 22 and surrounds micro hollows 20. The dielectric layer 30 can, for example, be a mica layer affixed to surface 22, or can be deposited on surface using known deposition techniques. When the spacing S is less than about the mean free path of electrons in the gas, the dielectric layer 30 may be omitted.

The anode 12 can have any desired configuration which permits an electric field to be established in the vicinity of cathode 10. Preferably, the anode 12 is planar and has an area that is approximately equal to the area of cathode 10, so that the spacing S between cathode 10 and anode 12 is approximately uniform over the area of surface 22. The planar anode can optionally have holes aligned with the micro hollows to provide a path for radiation generated by the discharge, a gas flowing through the micro hollows, or an electron or ion beam.

In cases where the power source 18 supplies an AC voltage to the discharge device, the anode 12 can be provided with micro hollows in the same manner as cathode 10. To avoid confusion in the AC configuration, cathode 10 is called "electrode 10", and anode 12 is called "electrode 12". Electrode 10 functions as a cathode during those half cycles of the AC voltage when electrode 12 is positive with respect to electrode 10, and electrode 12 functions as a cathode during those half cycles of the AC voltage when electrode 10 is positive with respect to electrode 12. By providing electrodes 10 and 12 with micro hollows as described above, micro hollow discharges are obtained on both half cycles of the AC voltage.

The gas in the discharge chamber 14 may, for example, be an inert gas such as argon, neon or xenon. However, any desired gas can be utilized, including mixtures of gases. As noted above, the pressure within discharge chamber 14 is preferably in a range of about 0.1 torr to atmospheric pressure. A number of applications utilize pressures in a range of about 0.1 torr to 200 torr.

The cathode 10 can be fabricated of any desired conductive material. However, materials with a high rate of secondary electron emission through ion impact are preferred. Suitable materials of this type include tungsten, barium oxide embedded in tungsten, thoriated tungsten, molybdenum and aluminum coated with oxygen. Materials, including composite materials, characterized by a low electron work function are suitable as cathode materials. Other suitable materials meeting these requirements are known to those skilled in the art. In an alternative configuration, the inside surfaces of micro hollows 20 are coated with materials that have high electron emissivity, and the remainder of cathode 10 is fabricated of any desired conductive material.

The discharge chamber 14 can have any desired size and shape. Typically, the discharge chamber is sealed to maintain pressure P in the discharge region, The chamber 14 may be fabricated, at least in part, of a material that transmits radiation generated by the discharge. Thus, for example, the discharge chamber 14 may be fabricated of a light-transmissive material, such as glass or quartz, or may have a radiation-transmissive window. In other embodiments, the discharge chamber 14 may be configured such that gas at pressure P flows through the discharge region.

The power source 18 may supply a DC voltage, a pulsed voltage or an AC voltage to the discharge device. For an AC voltage, a micro hollow discharge occurs only on half cycles when the anode 12 is positive with respect to the cathode 10, unless both electrodes have a micro hollow configuration as described above. The required voltage is typically in a range of about 300 to 600 volts. The micro hollow discharges have a positive voltage-current (V-I) characteristic over a large range of currents and voltages, which permits operation of the micro hollows in parallel without ballast resistors. The micro hollow discharge has been observed to operate at currents up to 200 to 500 milliamps per micro hollow.

Figure 2:
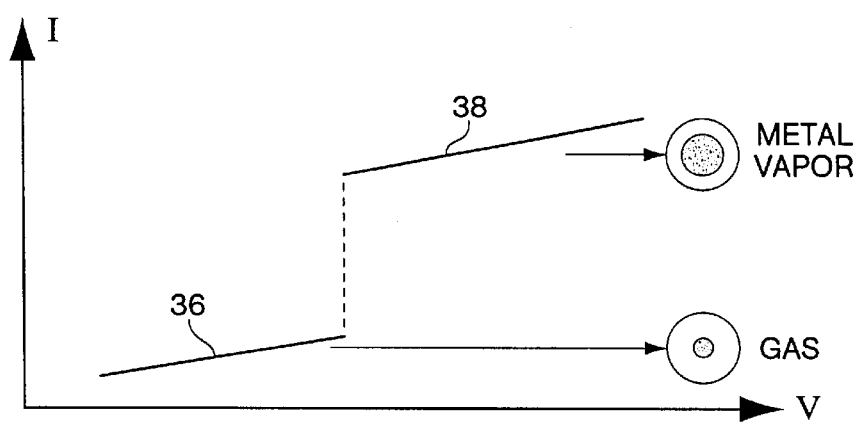
FIG. 2 is a graph of current as a function of voltage for the discharge device, illustrating the high glow mode and the low glow mode.

The micro hollow discharges have been observed to have two glow modes, as illustrated in FIG. 2. In a low glow mode 36 at relatively low voltage and current levels, the plasma column is located on the axis of the micro hollow and appears as a slight glow in the micro hollow. In a high glow mode 38, the plasma column fills almost the entire micro hollow and appears as a very bright discharge in the micro hollow. The high glow mode occurs at higher current and voltage levels. The discharge switches abruptly from the low glow mode to the high glow mode as the voltage is increased. In both modes, the discharges are stable and do not influence each other. Spectral measurements of the high glow mode indicate the presence of spectral lines from the cathode material, thereby suggesting increased sputtering of the cathode material in the high glow mode. Besides the gas ions, the metal ions of the sputtered electrode material contribute to the current flow and the secondary electron generation at the cathode.

The high and low glow modes refer to the discharges in the micro hollows 20. When the cathode 10 and the anode 12 have a spacing S greater than about the mean free path of electrons in the gas, a glow discharge occurs in the region outside the micro hollows 20 between cathode 10 and anode 12.

Figure 3:
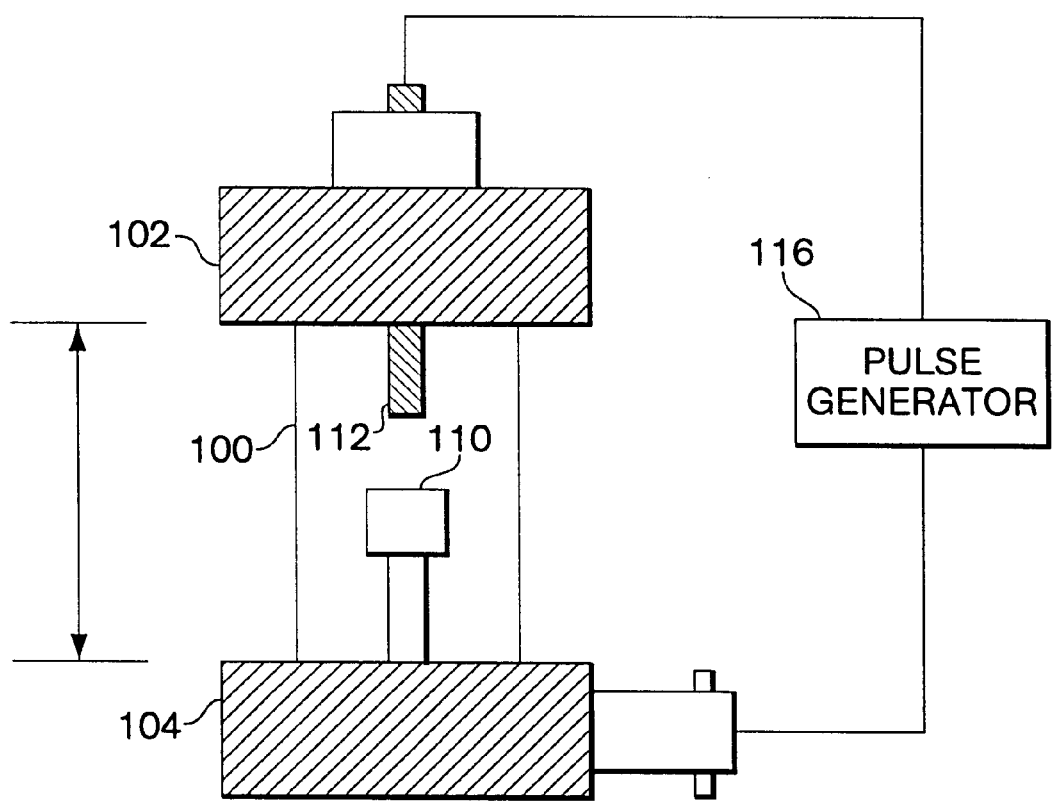
FIG. 3 illustrates an experimental setup for evaluation of the discharge device of the present invention.

A set of experiments was performed to investigate micro hollow cathode discharge in an argon-mercury environment with single and multiple cathode holes. A schematic diagram of the experimental configuration is shown in FIG. 3. A test chamber was defined by a glass tube 100 having a length of 23 cm and a diameter of 4 cm. The ends of glass tube 100 were sealed by stainless steel blocks 102 and 104. A cathode 110 and an anode 112 located within the chamber could be varied in spacing between 0.1 cm and 15 cm. Molybdenum cathodes with 1, 4 and 8 holes of 0.7 mm diameter and 2.1 mm depth were used. A Cober Model 605P High Power Pulse Generator 116 was used to supply a 360 microsecond pulse at 30 Hz to the cathode 110. The voltage across the discharge was measured using a Tektronix P-6015 100CX High Voltage Probe, and the current across the load was measured using a Tektronix AM503 current probe.

Figure 4:
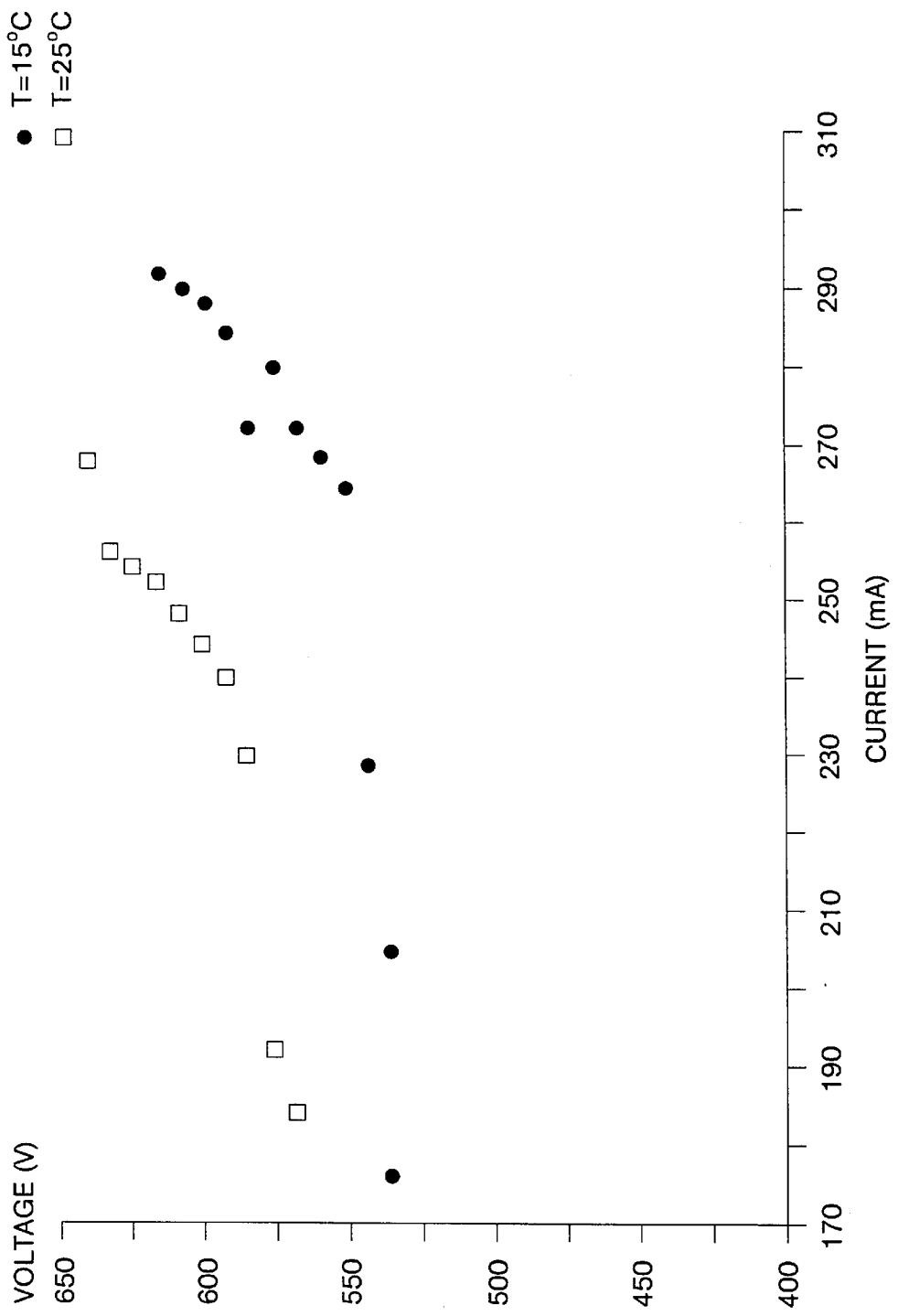
FIG. 4 is a graph of voltage as a function of current for a cathode having a single hole, and an anode-cathode separation of 2.5 centimeters.
Figure 5:
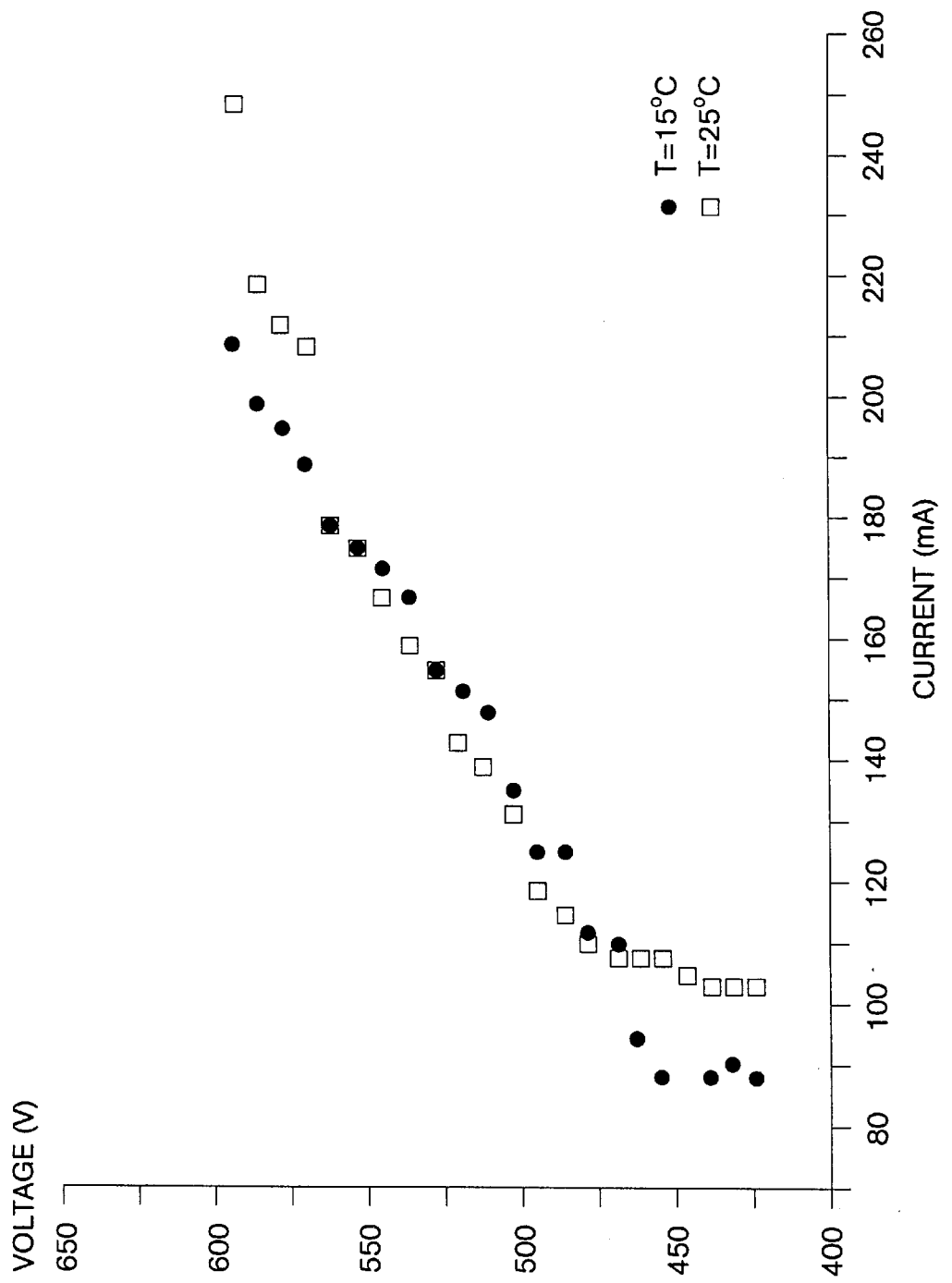
FIG. 5 is a graph of voltage as a function of current for a cathode having a single hole, and an anode-cathode separation of 5 centimeters.

Different gas pressures, different cold spot temperatures (mercury pressure), different electrode separations and different numbers of micro hollows were studied. FIG. 4 shows the voltage-current (V-I) characteristics of a cathode having a single micro hollow, with 2.5 cm electrode separation, a pressure of 3 torr of a mercury-argon mixture and cold spot temperatures of 15° C. and 25° C. A constant voltage discharge was observed at the low current level, for example, less than 240 milliamps for T=15° C. and less than 260 milliamps for T=25° C. Positive V-I characteristics were obtained at a higher current level. A higher cold spot temperature promotes a lower current level when the voltage is kept constant. At larger electrode separation, that difference disappears, and the V-I characteristics overlap. FIG. 5 shows the V-I characteristics of a cathode having a single micro hollow, with 5.0 cm electrode separation, a pressure of 3 torr and cold spot temperatures of 15° C. and 25° C. The threshold current for positive V-I characteristics is higher for higher cold spot temperatures, as shown in FIG. 5.

Figure 6:
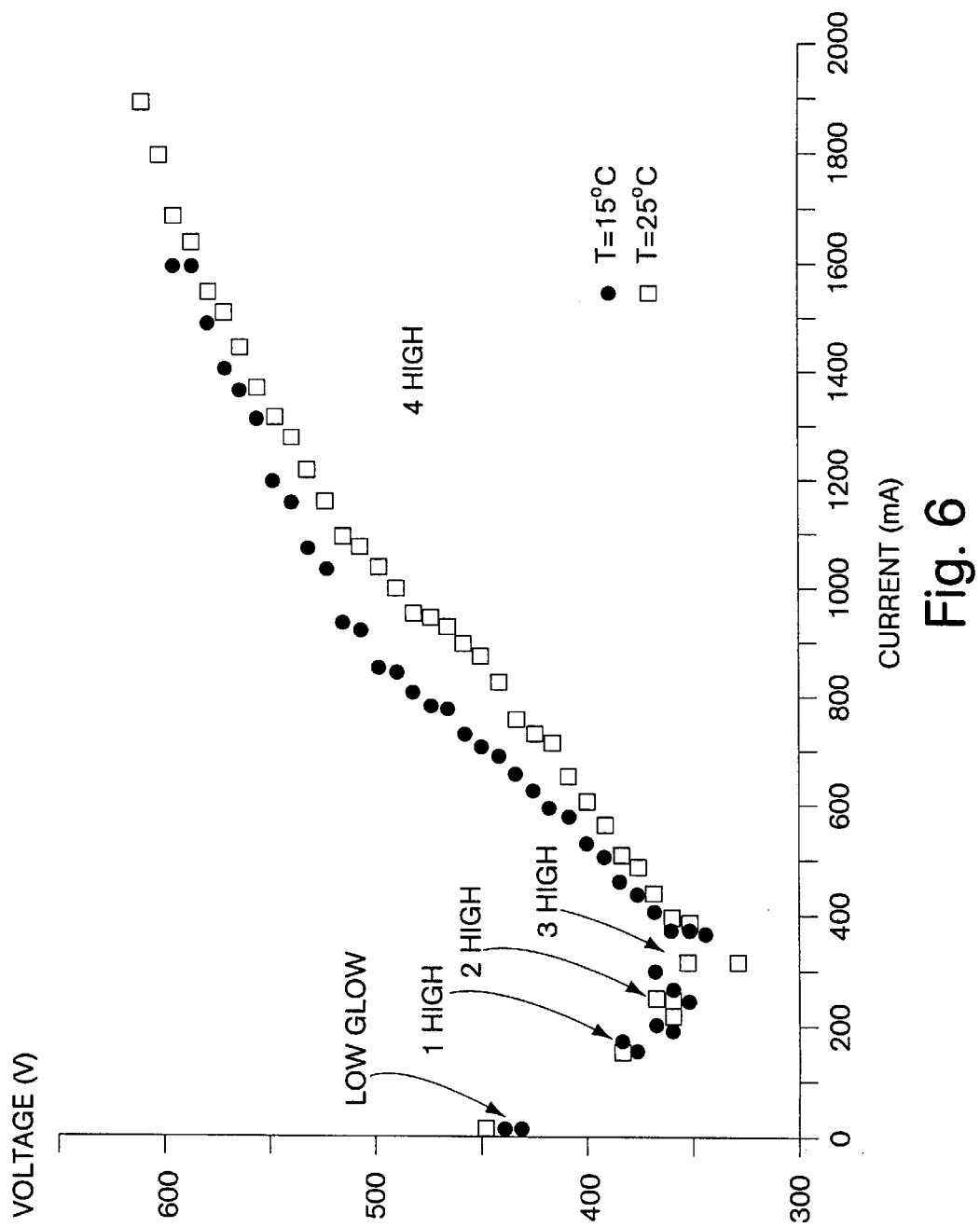
FIG. 6 is a graph of voltage as a function of current for a cathode having four holes, and an anode-cathode separation of 2.5 centimeters.
Figure 7:
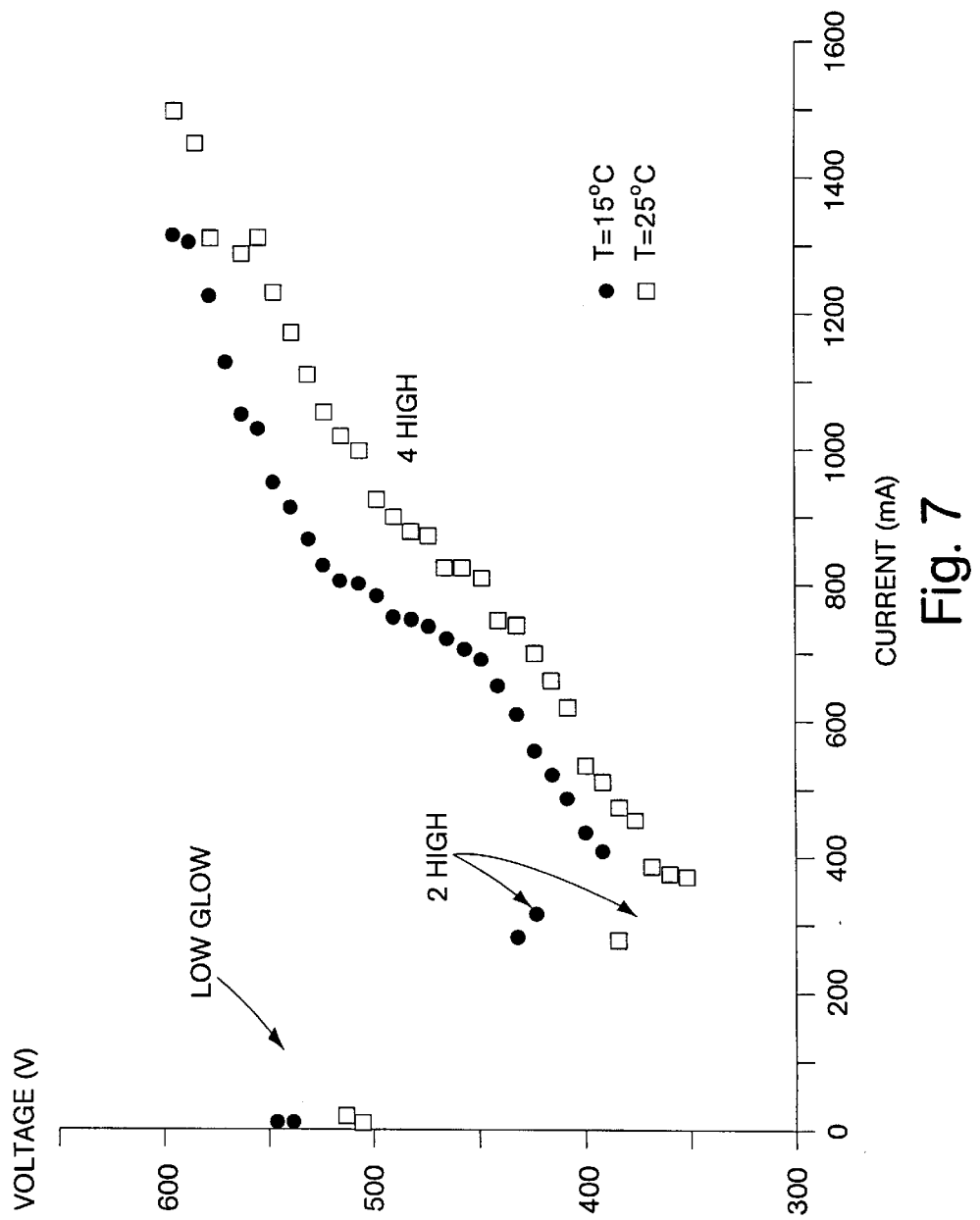
FIG. 7 is a graph of voltage as a function of current for a cathode having four holes, and an anode-cathode separation of 5 centimeters.

FIG. 6 shows the V-I characteristics of a cathode having four micro hollows, with 2.5 cm separation between electrodes, a pressure of 3 torr and cold spot temperatures of 15° C. and 25° C. FIG. 7 shows the V-I characteristics of a cathode having four micro hollows, with 5.0 cm separation between electrodes, a pressure of 3 torr and cold spot temperatures of 15° C. and 25° C. A discharge with four micro hollows demonstrated unstable conditions at low current levels. In the current range below 300 milliamps at 2.5 cm electrode separation and below 350 milliamps at 5.0 cm electrode separation, the four micro hollow cathode discharge switched consecutively from the low glow mode into the high glow mode. After all of the discharges operated in the high glow mode, the V-I characteristic became positive and stable. All four micro hollows were then operating in parallel with about equal light intensity. The threshold current levels correspond to 350 volts and 375 volts, respectively. The current at 25° C. was higher than at 15° C. when the voltage was maintained at a constant level.

Figure 8:
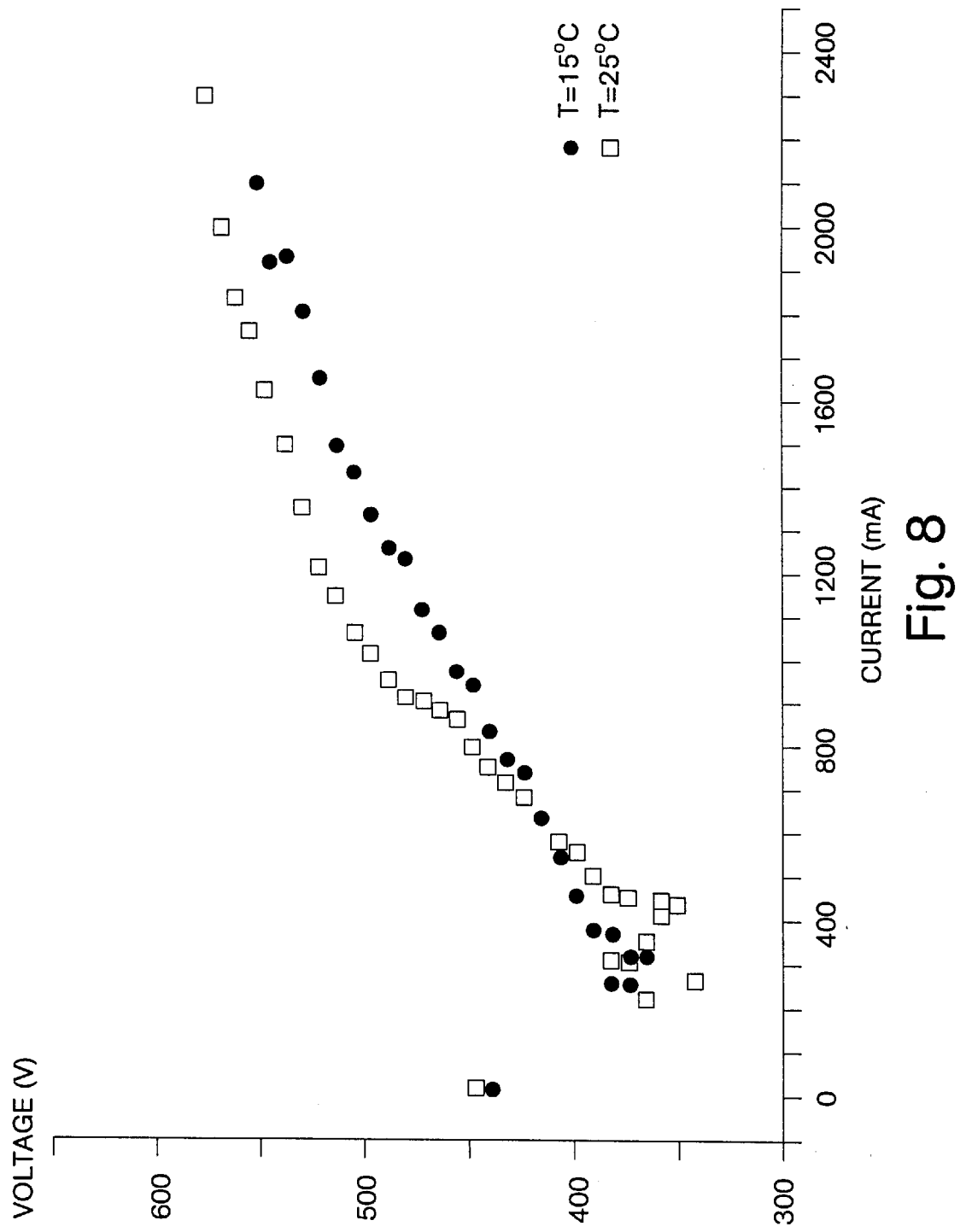
FIG. 8 is a graph of voltage as a function of current for a cathode having eight holes, and an anode-cathode separation of 2.5 centimeters.
Figure 9:
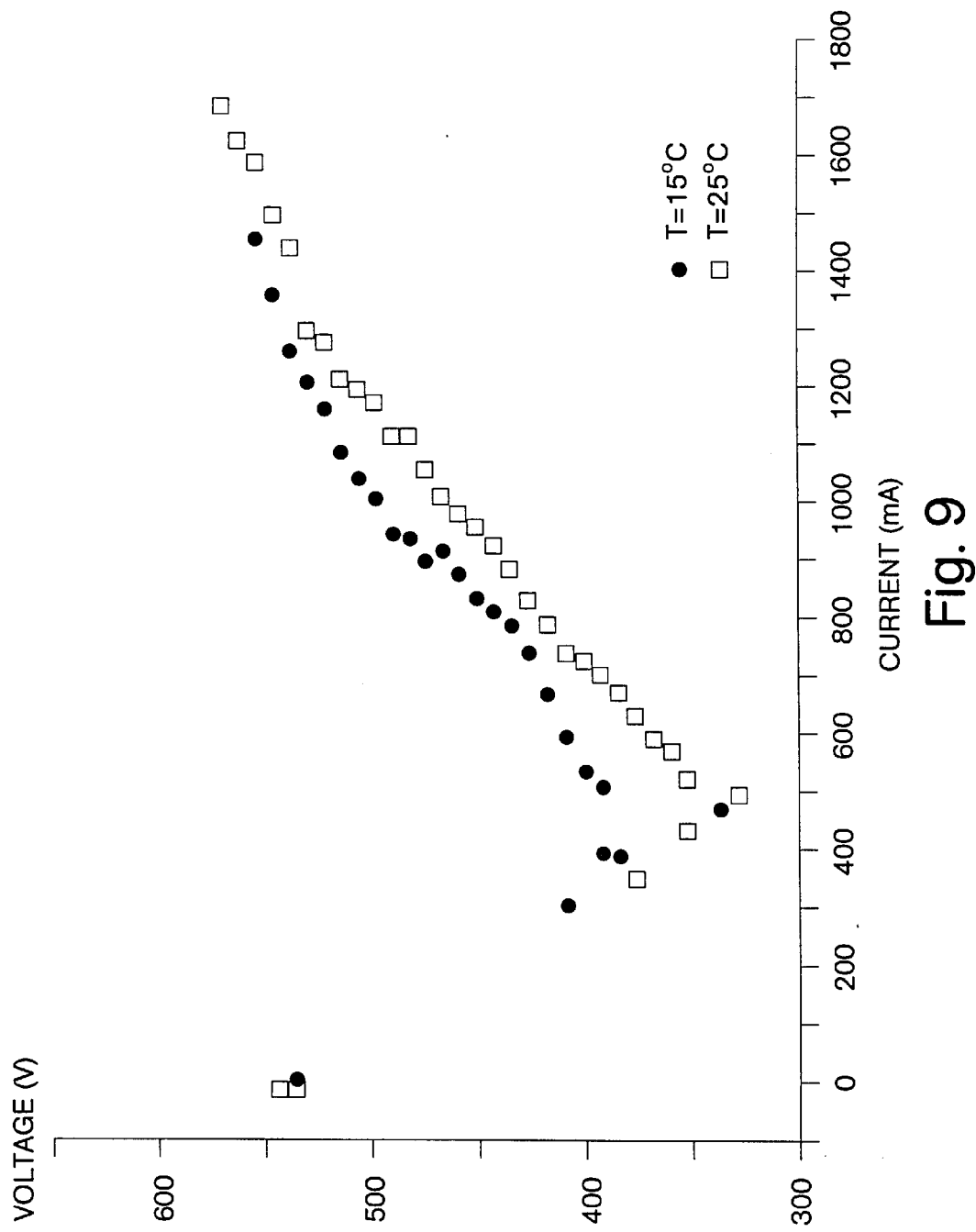
FIG. 9 is a graph of voltage as a function of current for a cathode having eight holes, and an anode-cathode separation of 5 centimeters.

FIG. 8 shows the V-I characteristics of a cathode having eight micro hollows with 2.5 cm electrodes separation, a pressure of 3 torr and cold spot temperatures of 15° C. and 25° C. FIG. 9 shows the V-I characteristics of a cathode having eight micro hollows with 5.0 cm electrodes separation, a pressure of 3 torr and cold spot temperatures of 15° C. and 25° C. The cathode having eight micro hollows operated in a parallel and stable manner for currents higher than 400 milliamps, corresponding to a voltage of 375 volts, at 2.5 cm separation (FIG. 8) and for currents higher than 500 milliamps, corresponding to a voltage of 350 to 375 volts, at 5.0 cm separation (FIG. 9), after all eight micro hollows transferred into the high glow mode. The current level obtained with eight micro hollows is only slightly higher than with four micro hollows. For example, at 450 volts, four micro hollows operate at 700 milliamps at 15° C. and 800 milliamps at 25° C., while eight micro hollows operate at give 950 milliamps and 950 milliamps for temperatures of 15° C. and 25° C., respectively.

Figure 10A:
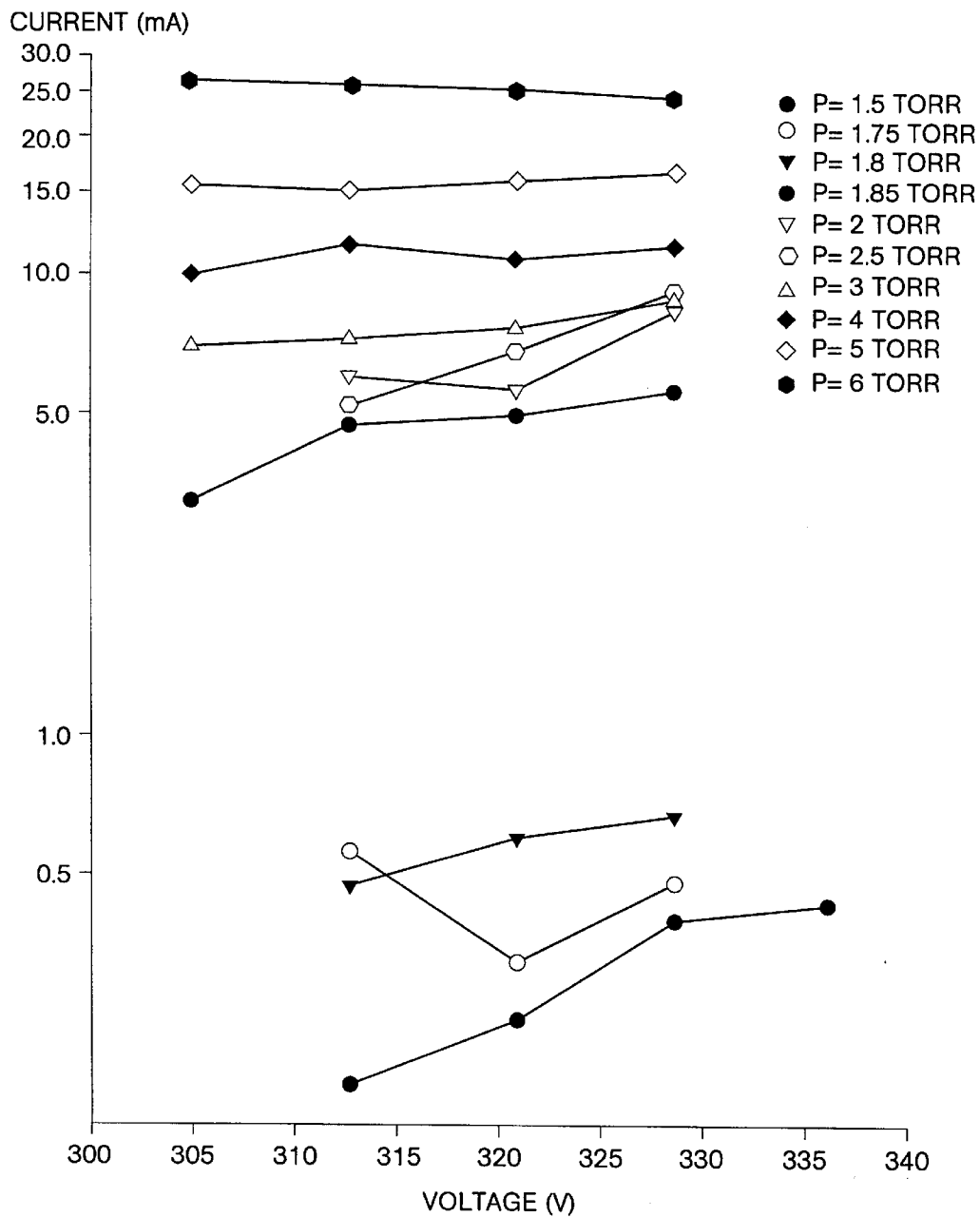
FIG. 10A is a graph of voltage as a function of current for a cathode having three holes and an anode-cathode separation of 0.2 millimeter, for pressures in the range of 1.5 torr to 6 torr and for the low current glow mode.
Figure 10B:
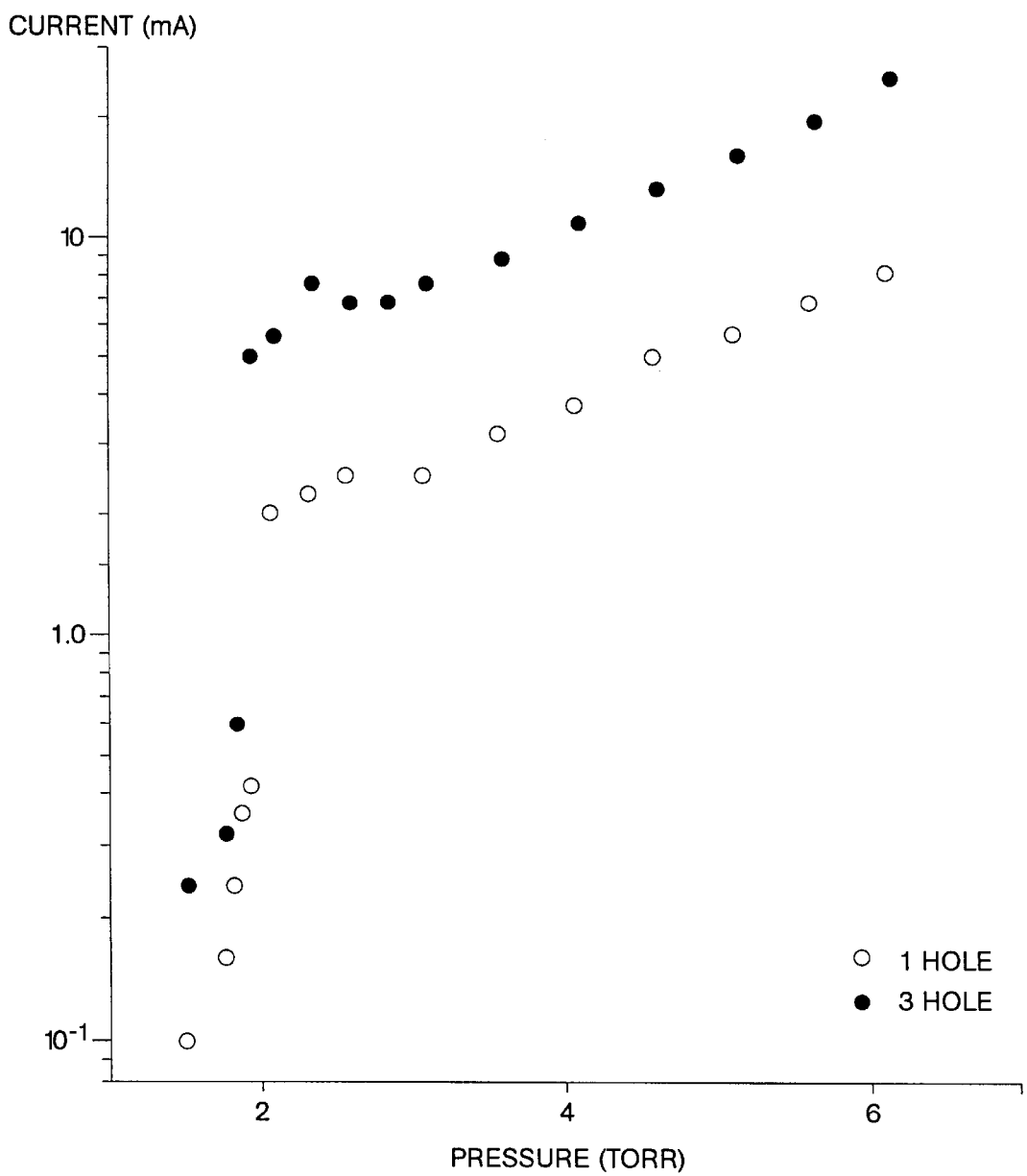
FIG. 10B is a graph of current as a function of pressure for the low current glow mode at 320 volts, for three hole and one hole discharges.

Another set of experiments was performed with a cathode having three holes to study parallel operation of micro hollow cathode discharge devices in a situation where the anode-cathode distance was less than the micro hollow diameter. Cathode holes having a diameter of 0.7 mm and a depth of 2.1 mm were drilled in a molybdenum disk. A molybdenum foil 12.7 micrometers thick with four 2 mm holes was used as the anode. The anode and cathode were separated by a 0.2 mm thick mica spacer. The voltage and current were measured as described above in connection with FIGS. 4–9. FIG. 10A illustrates the I-V characteristics of the three hole hollow cathode discharge with pressures between 1.5 torr and 6 torr. The discharge exhibited two modes of operation, the first being a submilliamp unstable glow mode indicated by the points below 1.0 milliamp in FIG. 10B, and the second being a low current glow mode indicated by the points above 1.0 milliamp in FIG. 10B. The discharge in the unstable glow mode was a slight glow that occupied only the center of the hole, and the discharge in the low current glow mode occupied about half the hole. FIG. 10B compares the current levels at a given voltage of the three hole discharge with a one hole discharge. Over the range of pressures shown in FIG. 10B, the ratio of three hole current to one hole current is about three, indicating the multiplication property of the micro hollow cathode discharge.

Figure 11:
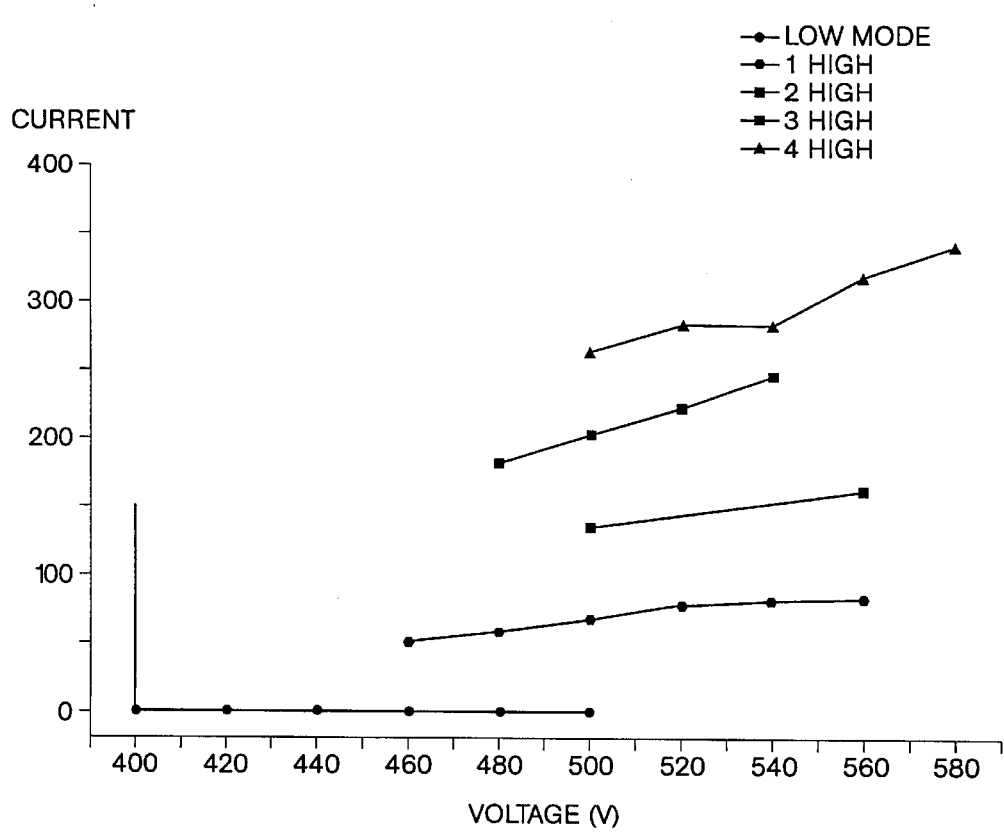
FIG. 11 is a graph of voltage as a function of current for a cathode having four holes at a pressure of two torr, showing a transition to the high current mode.

In another set of experiments with four holes with the same dimensions as above, the transition between the low current glow mode and the high current glow mode was observed. The high current glow mode was a very bright discharge that filled most of the hole. The discharge started with a low glow in each of the four holes, and as the voltage applied to the discharge was increased, the individual holes switched to the high glow mode. FIG. 11 shows that a low glow mode was obtained at 400 volts across the discharge. The discharge current increased linearly until 500 volts. Then, one of the holes transferred into the high glow mode, and the voltage decreased to 460 volts. The discharge continued with one hole in high glow mode until 580 volts was reached. At this point, a second hole transferred into the high glow mode and the voltage decreased to 500 volts. A third hole did not transfer into the high glow mode until the voltage reached 580 volts. At that point, the voltage across the discharge dropped to 480 volts. The fourth hole transferred to high glow mode when the discharge voltage reached 540 volts. The discharge voltage at this point decreased to 500 volts.

Spectra of the discharges were recorded at 3 torr argon pressure. A first spectrum was taken with all of the holes in the low glow mode, and a second was taken with three of the holes in the high glow mode. The discharges contained molybdenum lines when the high glow mode was present.

Figure 12:
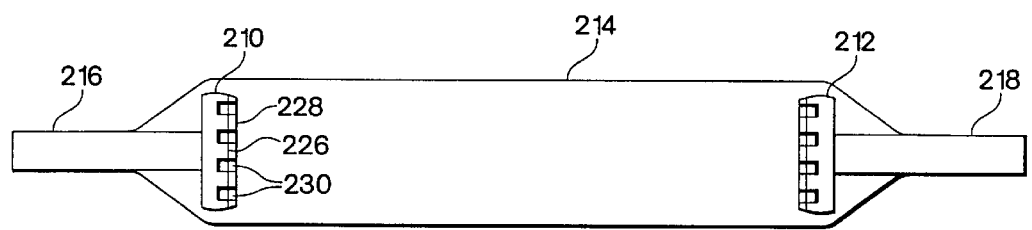
FIG. 12 is a simplified schematic diagram of a subminiature fluorescent lamp in accordance with the present invention.
Figure 13:
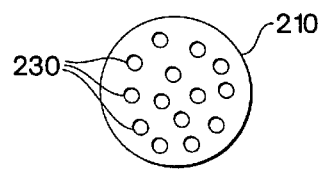
FIG. 13 is an axial view of the cathode in the subminiature fluorescent lamp of FIG. 12.

An application of the discharge device of the present invention is shown in FIGS. 12 and 13. The discharge device is configured as a fluorescent lamp for generation of visible light. The fluorescent lamp includes a first electrode 210 and a second electrode 212 sealed within a light-transmissive tube 214, which may be glass. The electrodes 210 and 212 are spaced apart and are preferably located at or near opposite ends of light-transmissive tube 214. Electrical conductors 216 and 218 extend from the exterior of light-transmissive tube 214 to electrodes 210 and 212, respectively, and permit connection of electrodes 210 and 212 to a source of electrical energy (not shown). The light-transmissive tube 214 defines a sealed chamber that is maintained at a desired pressure during operation. The conductors 216 and 218 extend through vacuum feedthroughs, as known in the art. The light-transmissive tube 214 contains a fill material for supporting a low pressure discharge between electrodes 210 and 212. The fill material is typically an inert gas, such as neon, argon or xenon, and mercury vapor. Typically, the inside surface of light-transmissive tube 214 is coated with a phosphor material that emits visible light in response to ultraviolet radiation generated by the discharge within the tube. A variety of phosphor materials are well known to those skilled in the art.

In the embodiment of FIGS. 12 and 13, the electrode 210 comprises a generally disk-shaped conductor. The electrode 210 preferably has a flat surface 226 that faces electrode 212 and has sufficient thickness for formation of micro hollows. An array of micro hollows 230 is formed in the surface 226 of electrode 210. Each of the micro hollows 230 comprises a hole having a prescribed diameter that extends from surface 226 into electrode 210. The diameter of each of the micro hollows 230 depends on the type of gas and the operating pressure within the discharge device. A dielectric layer 228 is disposed on surface 226 of electrode 210. The dielectric layer 228 surrounds but does not cover micro hollows 230.

In the embodiment of FIGS. 12 and 13, the micro hollows 230 are closed at one end. However, the micro hollows can extend entirely through electrode 210 within the scope of the present invention. The shape of the micro hollows is not critical. The micro hollows may, for example, be formed by drilling, thus defining a generally cylindrical shape. The electrode 210 can be fabricated of any conductive material, but is preferably fabricated of a low work function material that has high electron emissivity.

The diameter, D, of each of the micro hollows 230 is selected, depending on the operating pressure, P, and the gas type within the light-transmissive tube 214, to produce a micro hollow discharge within each of the micro hollows 230. In particular, the diameter D of each of the micro hollows is preferably on the order of the mean free path of electrons in the light-transmissive tube 214. For rare gases, this condition is met when the product P·D is in a range of about 0.1 to 10, where the pressure P is specified in torr and the diameter D is specified in centimeters. The operating pressure and the type of gas are usually established by other design considerations, thus setting an allowable range of diameters for the micro hollows. Fluorescent lamps typically contain argon and mercury vapor. Conventional fluorescent lamps typically operate at pressures of 0.5 to 2.0 torr, whereas subminiature fluorescent lamps may operate at pressures of 20 to 200 torr. By way of example, for a subminiature fluorescent lamp having a pressure of argon and mercury in the range of 20 to 200 torr, the micro hollows 230 preferably have diameters in the range of 0.5 cm to less than 50 micrometers. The number of micro hollows 230 is selected to produce a desired total discharge current. Preferably, the micro hollows are relatively uniformly distributed over surface 26, and the surface 26 between micro hollows is covered by dielectric layer 228.

In the fluorescent lamp, the radiation that stimulates the phosphor coating on the light-transmissive tube 214 is generated in the positive column between electrodes 210 and 212. The micro hollows function as a source of electrons, and generation of radiation within the micro hollows is not important. For this reason, the micro hollow cathode is preferably operated in the low glow mode for fluorescent lamp applications.

The electrode 210 is configured to function as a cathode for emission of electrons when it is biased negatively with respect to electrode 212. For typical fluorescent lamp applications, the electrode 212 is fabricated with an array of micro hollows and a dielectric layer in the same manner as electrode 210. In this configuration, an AC voltage is applied between conductors 216 and 218. Electrode 210 functions as a cathode during those half cycles of the AC voltage when electrode 212 is positive with respect to electrode 210, and electrode 212 functions as a cathode during those half cycles of the AC voltage when electrode 210 is positive with respect to electrode 212.

In another embodiment, the electrode 212 is not fabricated with an array of micro hollows and has a conventional anode configuration. In this embodiment, electrode 212 functions continuously as an anode, and electrode 210 functions continuously as a cathode. A DC voltage or a pulse train is applied between conductors 216 and 218 in this configuration.

The electrodes 210 and 212 are preferably fabricated of a material with a high rate of secondary emission through ion impact. Preferred materials include tungsten, barium oxide embedded in tungsten, thoriated tungsten and molybdenum. Materials, including composite materials, characterized by a low electron work function are suitable as electrode materials.

A variety of different gases can be utilized in the fluorescent lamp of FIGS. 12 and 13. Preferred gases include mercury vapor mixed with an inert gas, such as argon or krypton, an inert gas, such as neon, without mercury vapor, an excimer of an inert gas, such as $Xe_2$, vapors of sulfur or selenium, and combinations thereof.

In an example, the fluorescent lamp shown in FIGS. 12 and 13 is configured as a subminiature fluorescent lamp. The light-transmissive tube 214 has an outside diameter of 7 mm, and the spacing between electrodes 210 and 212 is about 100 mm. The tube 214 contains argon and mercury at a pressure of about 100 torr. Each of the electrodes 210 and 212 has a diameter of about 5 mm and is provided with about 20 micro hollows 230. The micro hollows have diameters of about 50 micrometers. The lamp is expected to operate in the low glow mode at about 300 volts and a current of about 200 milliamps. In another example of the fluorescent lamp, the light transmissive tube 214 is 100 mm long and has an outside diameter of 3 mm. The tube 214 contains argon and mercury at a pressure of about 50 torr. Each of the electrodes 210 and 212 has a diameter of about 1 mm and is provided with about 10 micro hollows 230. The micro hollows have diameters of about 50 micrometers. The lamp is expected to operate in the low glow mode at about 400 volts and a current of about 5 milliamps per micro hollow. In general, the spacing between electrodes can vary between 10 cm and 100 cm, the pressure can vary between 1 and 200 torr, the micro hollow diameters can vary between 10 and 1000 micrometers, and the number of micro hollows can vary from 5 to 50 in order to achieve currents of 5 to 100 milliamps and voltages of 20 to 500 volts. The range of selected parameters provides discharge conditions with minimum electrode sputtering, maximum light output (10 to 1000 lumens) and extended life (500 to 5000 hours). This range is defined by subminiature fluorescent lamp conditions and applications.

The fluorescent lamp of FIGS. 12 and 13 has been described in connection with subminiature fluorescent lamps which have relatively small dimensions and which operate at relatively high pressure. However, the cathode having an array of micro hollows is not limited to application in subminiature fluorescent lamps. The cathode having an array of micro hollows can be used in any fluorescent lamp where the operating pressure permits an array of suitably dimensioned micro hollows to obtain desired operating characteristics. The size and number of micro hollows is selected for a given operating pressure and current requirement. Furthermore, the phosphor coating on the light-transmissive tube can be omitted when the discharge within the tube produces a desired radiation spectrum. Different fill materials can be utilized within the scope of the present invention. Specifically, mercury free fluorescent lamps can more easily be realized in the micro hollow cathode array system, since the expected electron energy distribution function is enriched with the high energy electrons and therefore promotes excitation of higher energy levels of typical gases considered for mercury replacement. Ionization is also enhanced in this discharge arrangement. The cathode having an array of micro hollows can optionally be heated to increase electron emission further.

Another application of the discharge device of the present invention is as an excimer lamp, which generates far ultraviolet radiation, typically in the wavelength range of 80–200 nanometers. The excimer lamp can be used for water purification, pasteurization, waste treatment and surface treatment of materials. The excimer lamp typically operates at a relatively high pressure, on the order of 100 torr or higher and contains a gas, such as xenon or neon, that forms dimers at high pressures. Other suitable gases include all other noble gases and mixtures of noble gases with halogens. For operation at pressures on the order of one atmosphere, the micro hollows have diameters on the order of 10 to 100 micrometers. The excimer lamp can have any desired configuration such as, for example, the discharge device shown in FIG. 1. Alternatively, the excimer lamp may have a configuration similar to the fluorescent lamp shown in FIG. 12 or the flat light sources shown in FIGS. 17 and 19. Generally, since the part of the discharge outside the micro hollows does not contribute to the excimer radiation, it can be eliminated, thus forming a flat light source with the anode-cathode distance shorter than the electron mean free path. All or a portion of the discharge chamber is fabricated of a material, such as quartz, that transmits ultraviolet radiation at the wavelength generated within the discharge chamber. This far ultraviolet radiation can be converted inside the lamp into visible radiation by a specially designed phosphor. Although the efficiency of such a lamp is at present lower than the efficiency of standard fluorescent lamps, this environmentally friendly lamp fill makes it an attractive alternative.

Figure 16:
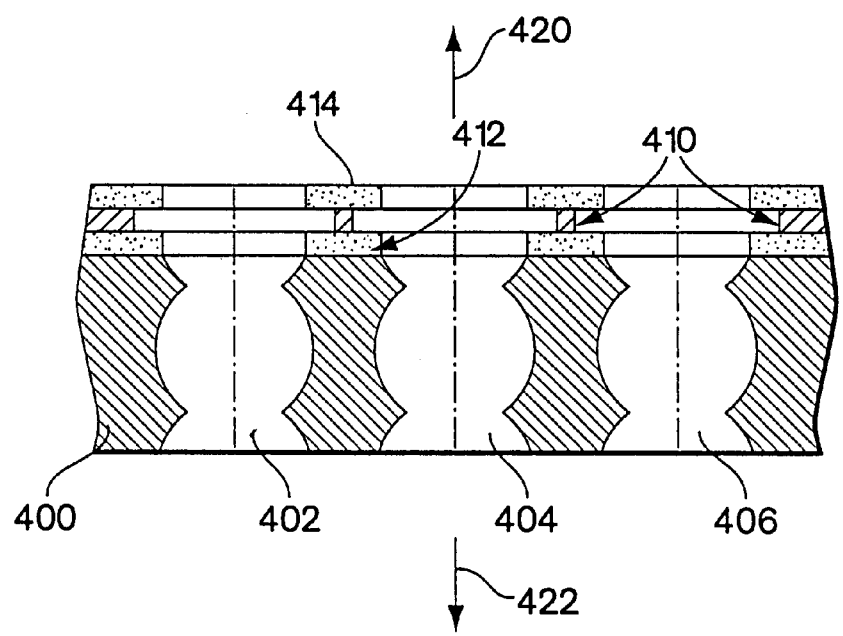
FIG. 16 is a partial cross-sectional view of a discharge device suitable for use as an excimer light source in accordance with the present invention.

The excimer lamp can also be implemented as a micro hollow discharge array, as shown in FIG. 16. A conductive cathode 400 is provided with an array of micro hollows 402, 404, 406, etc., as described above in connection with FIG. 1. An anode 410 is spaced from cathode 400 by a dielectric layer 412. A second dielectric layer 414 is formed on the opposite surface of anode 410. The anode 410 may be a thin metal film. The anode 410 and the dielectric layers 412 and 414 may, for example, be formed by sputter deposition on cathode 400. The anode 410 and the dielectric layers 412 and 414 have openings aligned with each of the micro hollows 402, 404, 406, etc.

A further application of the discharge device of the present invention is as a miniature gas laser. As discussed above, the increased current of hollow cathode discharges compared to glow discharges between planar parallel electrodes is believed to be due to the high ionization rate of nonthermal electrons, which oscillate between opposite cathode surfaces inside the cathode hole. The high energy electrons may be used for transverse pumping of miniature gas lasers, operated at gas pressures of up to one atmosphere. These miniature gas lasers, which in size are almost comparable to semiconductor lasers, may emit over a wide spectral range which reaches into the ultraviolet. The hollow cathode discharge pumped lasers are expected to be efficient. The lifetime is expected to be long because of low cavity erosion, due to a balance of sputtering and redeposition in the cathode hole.

The radially accelerated, nonthermal electrons in a cylindrical micro hollow discharge unload most of their energy close to the axis of the cathode hole. This energy is close to the free fall energy of the electrons, which corresponds to the value of the applied voltage. For submillimeter micro hollow discharges, the forward voltage is about 100 to 500 volts. An electron energy of tens up to several hundred electron volts is optimum for collisional ionization and excitation of atoms and molecules. Most of the cross sections for excitation peak at about this value. When the micro hollow discharge is used for laser pumping, the highest rate of excitation of the upper laser state is on the axis of the cathode hole, with a steep decay toward the wall of the micro hollow. For micro hollow discharges where the initially cylindrical cathode hole may turn into a spherical one due to sputtering and redeposition of electrode material, the maximum energy deposition will occur at the electron focal point rather than along a focal line. In order to avoid this nonhomogenous distribution, the cathode hole is shortened in length to a dimension that is significantly smaller than its diameter. For a 100 micrometer diameter, a cathode hole length of about 25 micrometers is suitable. Transverse pumping with micro hollow cathode discharges provides a class of gas lasers which are almost as compact as semiconductor lasers. An additional advantage of these devices is the low noise level of the laser intensity compared to that of lasers pumped by conventional discharges. The noise may be reduced by two orders of magnitude.

The helium-neon laser is particularly appropriate for micro hollow discharge pumping, because experimental results in capillary tubes with diameters of approximately 1 mm show that optimum gain is obtained when the pressure times distance product is 0.36 torr-cm, a value close to the optimum pressure times diameter product for micro hollow cathode operation. The optimum relative pressures of helium and neon depend on the discharge diameter only. For a helium-neon laser pumped with 100 micrometer diameter micro hollows, the optimum pressure is 36 torr, with 32 torr of helium and 4 torr of neon. The optimum power of this laser is expected to be about 0.5 microwatt for a 0.5 mm long, 100 micrometer diameter micro hollow cathode pumped with continuous wave energy.

Micro hollow discharges are believed to be ideally suited as pump sources for metal ion lasers, with metals such as cadmium, silver, gold, lead and others. Micro hollow discharges provide metal ions through continuous sputtering, instead of thermal processes, to create a sufficient metal vapor pressure. Lasing from ultraviolet to near infrared has been demonstrated with hollow cathode pumping in various metal ion lasers.

The micro hollow cathode discharge device of the invention may also be used for pumping of rare gas ion lasers. The pressure times distance value for rare gas ion lasers is close to the optimum pressure times diameter value for micro hollow discharges. A micro hollow cathode discharge with micro hollows having diameters of 100 micrometers can pump a rare gas laser operated close to atmospheric pressure. Micro hollow cathode discharges may also be used as pump sources for nitrogen lasers and rare gas halide excimer lasers.

Figure 14:
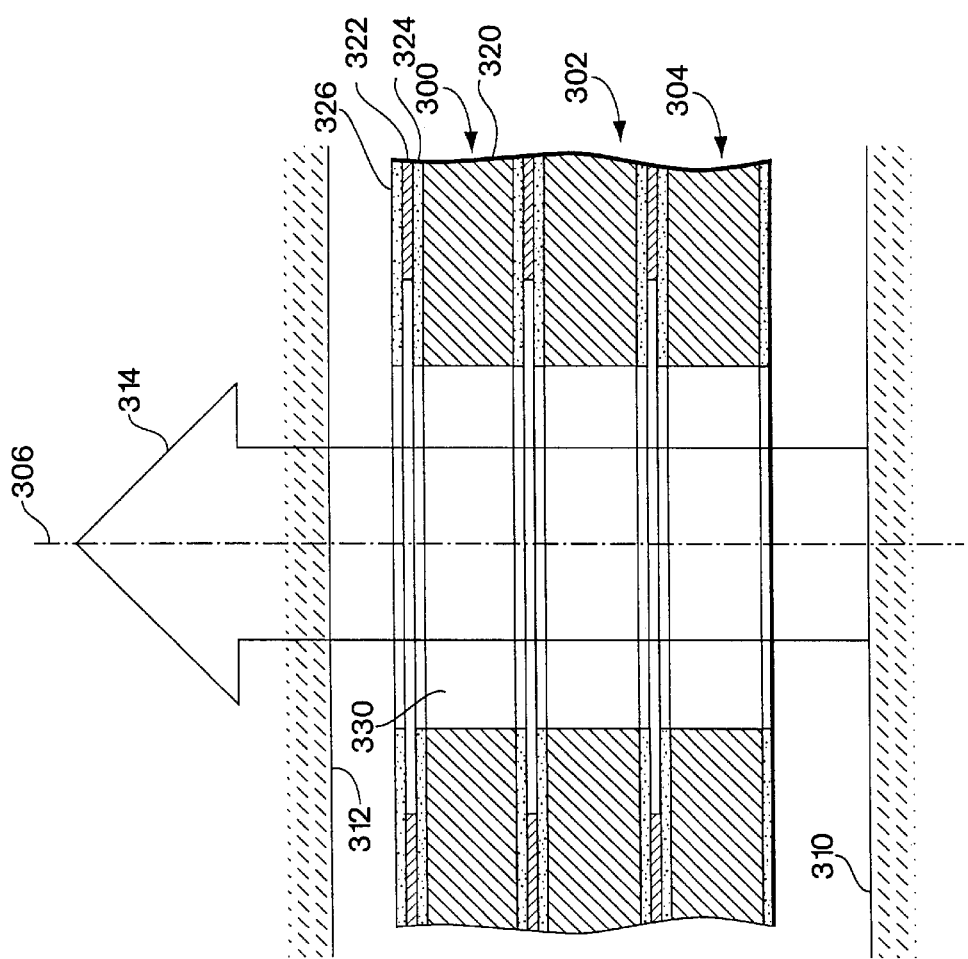
FIG. 14 is a schematic, cross-sectional diagram of a gas laser using the discharge device of the present invention for optical pumping.

A cross sectional view of a single micro hollow discharge pumped miniature gas laser is shown in FIG. 14. Micro hollow discharge elements 300, 302, and 304 are stacked along an optical axis 306 of the laser. Different numbers of micro hollow discharge elements can be utilized to provide desired laser characteristics. The discharge elements 300, 302, and 304 are positioned between a totally reflecting mirror 310 and a partially reflecting mirror 312. The partially reflecting mirror 312 permits transmission of a laser beam 314 from the laser. The reflection characteristics of mirrors 310 and 312 are defined at the operating wavelength of the laser.

The discharge element 300 includes a cathode 320 and an anode 322 separated by a first dielectric layer 324. A second dielectric layer 326 is formed on the opposite surface of anode 322. The cathode 320 is provided with a micro hollow 330 having a diameter that is selected, based on the type of gas and gas pressure in the discharge region, to support a micro hollow discharge. For operation near atmospheric pressure, the diameter of micro hollow 330 is preferably on the order of about 10 micrometers. As noted above, the depth of the micro hollow 330 is preferably less than its diameter to ensure relatively uniform pumping along optical axis 306. In a preferred embodiment, the cathode 320 has a thickness on the order of 25 micrometers. The anode 322 and the dielectric layers 324 and 326 have openings that are aligned with the micro hollow 330 to provide an unobstructed path along axis 306. The anode 322 and the dielectric layers 324, 326 can, for example, be formed by sputtering on cathode 320. Discharge elements 302 and 304 have the same structure as discharge element 300. The discharge elements 300, 302, and 304 are attached to each other with micro hollows 330 aligned to provide a laminated discharge structure. As noted above, more or fewer discharge elements can be utilized in the miniature gas laser of FIG. 14.

Figure 15:
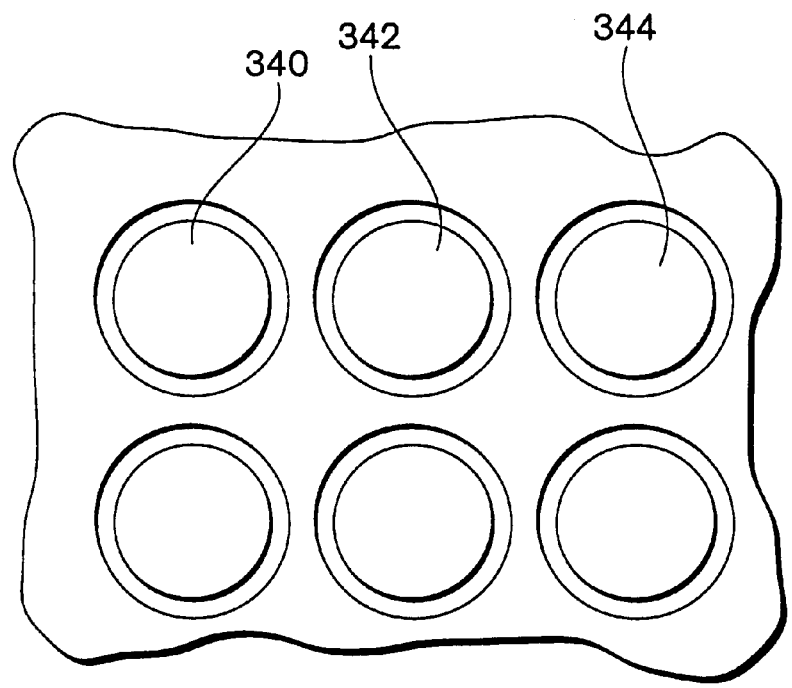
FIG. 15 is an axial view of an array of micro hollows.

An axial view of an array of micro hollows configured as an array of miniature gas lasers is shown in FIG. 15. The laser array includes array elements 340, 342, 344, etc., each of which may be constructed as shown in FIG. 14 and described above. The laser array may have any desired number of elements and may have a regular pattern of rows and columns, or may have an irregular pattern. Each discharge element of the laser array may be constructed using conventional microlithography techniques. The discharge elements can be bonded together to provide the laminated structure shown in FIG. 14. The laser array generates multiple laser beams.

In yet another application of the discharge device of the present invention, the micro hollow cathode discharge array is used as an electron source or an ion source. As described above, electrons and ions are generated within the micro hollows of the micro hollow cathode. With reference to FIG. 16, electrons generated within micro hollows 402, 404, 406, etc. are accelerated in a direction indicated by arrow 420, and ions are accelerated in a direction indicated by arrow 422.

In a further application of the discharge device of the present invention, the micro hollow array is utilized in a thin, flat light source, typically a fluorescent light source. In this application, a micro hollow cathode is made of a grid of conductors, such as a wire mesh, having spacings which are preferably in the submillimeter range. The cathode is in close proximity to a planar anode. The flat light source can, for example, be used for backlighting of a display. The micro hollows are formed as rings rather than cylindrical holes. The micro hollows are implemented in accordance with the invention as described above, but have small axial dimensions that are substantially less than their cross-sectional dimensions. The micro hollows may be, but are not required to be, open at both ends. Uniformity of the discharge distribution in the micro hollows depends on the gas type, gas pressure, applied voltage and the mesh or grid size. While the light source is described as being flat, it will be understood that the components can be curved in a desired contour, if desired.

Display systems which utilize liquid crystals require some form of backlighting. This is conventionally achieved by tubular fluorescent lamps with optical elements such as reflectors, collimators and diffusers. The discharge device of the present invention is utilized by placing an array of micro hollow discharges directly behind a phosphor coating to achieve relatively homogeneous illumination. The micro hollow cathode may consist of a metal mesh with openings in the submillimeter range placed between the phosphor coating and a planar metal anode.

Because of the positive voltage-current characteristics of micro hollow discharges, it is possible to operate them in parallel. The micro hollows do not necessarily have an extended depth in the cathode material but may have the form of a ring. Even the cylindrical shape of the micro hollows is not a precondition for micro hollow cathode discharges. The micro hollow shape may be quadratic, rectangular or beehive style. Thus, metal meshes with openings in the submillimeter range can be utilized in a micro hollow cathode array. The anode can be a planar conductor separated from the cathode by a distance which is comparable to or smaller than the cross-sectional dimensions of the micro hollows.

Figure 17:
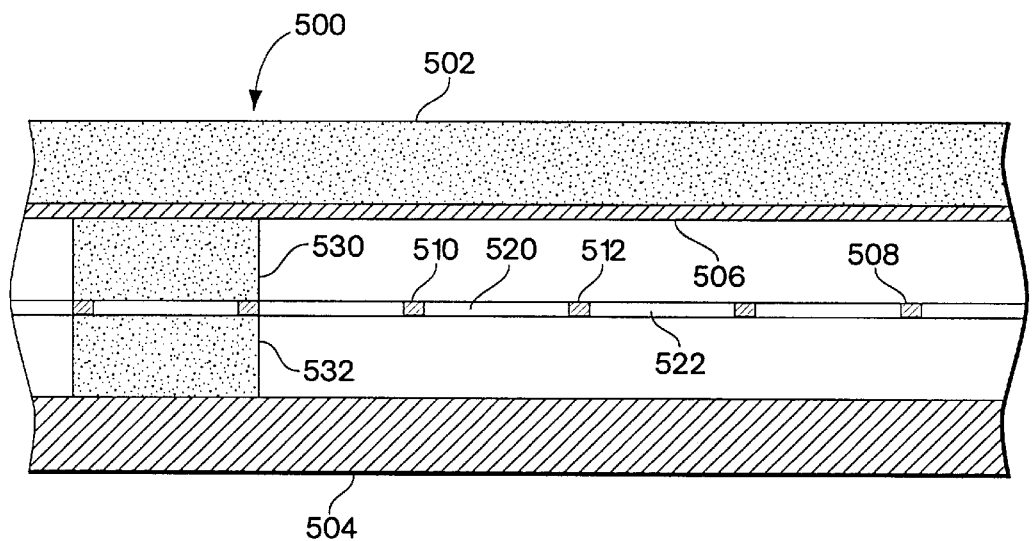
FIG. 17 is a partial cross-sectional view of a flat fluorescent light source in accordance with the present invention.

A partial cross-sectional view of a flat light source in accordance with the present invention is shown in FIG. 17. A discharge chamber 500 includes a light-transmissive wall 502 and a conductive wall 504. In the embodiment of FIG. 17, the light transmissive wall 502 and the conductive wall 504 are planar, parallel, spaced-apart sheets and are closely spaced. The light-transmissive wall 502 and the conductive wall 504 are sealed around their edges to define a sealed discharge volume. A cathode is positioned in the discharge chamber between light-transmissive wall 502 and conductive wall 504. A phosphor coating 506 may be applied to the inside surface of light-transmissive wall 502. A gas at a prescribed pressure is sealed within the discharge chamber 500.

In the embodiment of FIG. 17, the cathode is an electrically-conductive mesh 508. The mesh 508 comprises a grid of spaced-apart wires or other conductive strips which define a plurality of micro hollows. More specifically, with reference to FIG. 18, wires 510, 512, 514 and 516 define a micro hollow 520. The wires 510 and 512 are parallel to each other and are perpendicular to wires 514 and 516. The micro hollow 520 in the example of FIG. 18 has a square cross-sectional shape with sides equal to the spacing between the mesh wires. The axial depth of micro hollow 520 is defined by the diameters of mesh wires 510, 512, 514 and 516. The wires of the mesh 508 similarly define an array of micro hollows, such as micro hollows 522, 524, 526, etc. The spacing between adjacent micro hollows is determined by the mesh wire diameter.

The mesh 508 is spaced from light-transmissive wall 502 by a dielectric spacer 530 and is spaced from conductive wall 504 by a dielectric spacer 532. It will be understood that dielectric spacers 530 and 532 may be located as required to maintain a desired spacing of mesh 508 with respect to light-transmissive wall 502 and conductive wall 504. The dielectric spacers 530 and 532 may, for example, be in the form of elongated strips.

In operation, a voltage is applied between mesh 508, which functions as the cathode of the discharge device, and conductive wall 504, which functions as the anode. A micro hollow discharge is produced in each of the micro hollows 520, 522, 524, 526, etc. defined by the mesh 508. The radiation generated by the micro hollow discharges stimulates emission of visible light by phosphor coating 506. The light emitted by the phosphor coating 506 passes through light-transmissive wall 502 and appears as a generally uniform planar light source.

In the light source of FIG. 17, the fill gas may be a noble gas with mercury vapor, with dominant emission in the ultraviolet. Other suitable gases include inert gases, such as xenon, krypton and argon, or their excimers which would emit ultraviolet radiation, visible radiation or a combination of visible and ultraviolet radiation. The micro hollow cathode discharge enhances the high energy tail in the electron energy distribution function, allowing for more efficient excitation of excimer states than conventional discharges. Molecular gases, such as nitrogen, oxygen or air, and sulfur or selenium vapors, and their mixtures with inert gases, may be used in the flat light source. The gas pressure depends on the diameter of the cathode holes. For a mesh with 200 micrometer openings and 50 micrometer wire diameter, the pressure is preferably in a range of about 10 to 500 torr. The applied voltage is on the order of 400 volts DC or pulsed. Preferably, the mesh spacing is in a range of 10–500 micrometers, which depends on the gas and gas pressure. In cases where it is not necessary to change the wavelength of the radiation generated in the micro hollows, the phosphor coating 506 may be omitted.

Experiments were performed to study the gas discharge between a planar electrode and a mesh electrode for utilization as a flat light source. The experimental setup included a vacuum chamber which included a planar anode made of tungsten impregnated with barium, and a nickel mesh with quadratic openings of 0.206 mm width separated by 0.044 mm wide metal bars, or strips, of 0.0014 mm thickness. The spacing between the electrodes was on the order of 0.15 mm, determined by a mica spacer having an opening of about 2.5 mm. The gas was air at a pressure of 37.5 torr. A voltage pulse with a droop of about 10% over the entire duration of 0.4 milliseconds was applied to the electrodes, and the current through the discharge was monitored with a current viewing resistor. Simultaneously, the discharge was observed by a CCD camera connected to a magnifying system.

The results were as follows. At an applied voltage of 384 volts and with the mesh biased negatively, the current at the beginning of the pulse was measured at 33 milliamps. The current decayed to about half this value over the duration of the voltage pulse, indicating a nonlinear dependence of the current on the voltage. Discharges developed in the mesh openings. Two types of discharges were observed: a dim discharge centered in the mesh openings in a majority of the holes, and a bright, centered discharge in a small number of holes. With an increasing number of pulses, the dim discharges became brighter, and the initially bright discharges lost intensity. The current did not change significantly during the transition phase from inhomogeneous to more homogeneous light distribution. Continuous operation in this mode leads to substantial erosion of the mesh. In another experiment after more than 500,000 pules, the 0.0014 mm bar was completely eroded at the position of the brightest discharge. These results indicate that the flat light source needs to be operated in a low glow mode to avoid erosion. This also guarantees long lifetime and preferable operation for lighting applications. Experiments with reverse polarity (the planar electrode 504 functioning as the cathode) showed a homogeneous glow at a lower current of 16 milliamps and reduced intensity at the same voltage and pressure indicated above.

Figure 19:
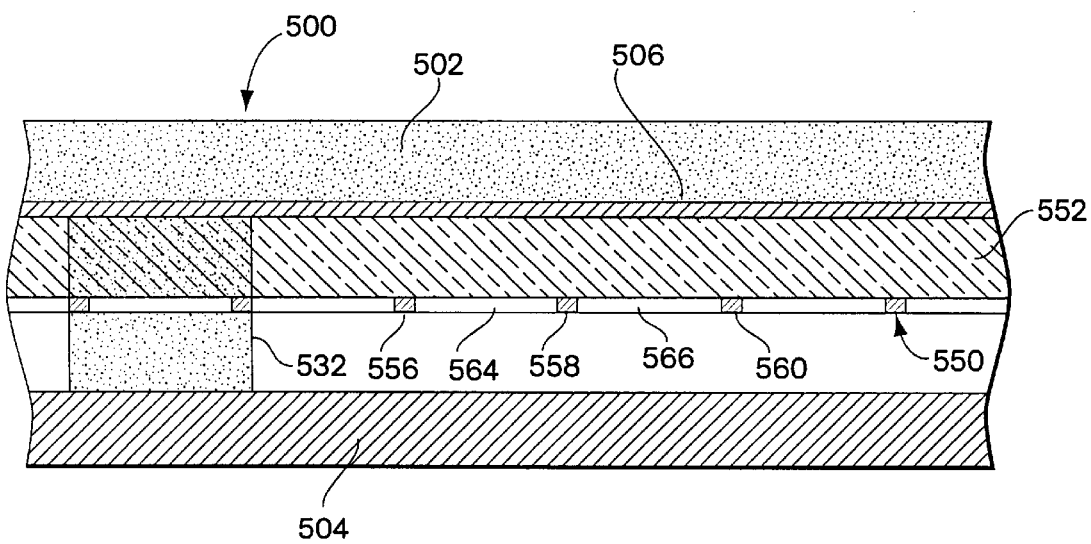
FIG. 19 is a partial cross-sectional view of an alternate embodiment of the flat fluorescent light source.

An alternate embodiment of the flat light source is shown in FIG. 19. Like elements in FIGS. 17 and 19 have the same reference numerals. In the embodiment of FIG. 19, a cathode 550 is formed as a conductive pattern on a transparent substrate 552. The cathode 550 includes a grid of spaced-apart conductive lines 556, 558, 560, etc. which define micro hollows 564, 566, etc. The conductive pattern of cathode 550 can have any desired configuration for defining a plurality of micro hollows. The conductive pattern may formed using conventional microlithography techniques. In the embodiment of FIG. 19, the substrate 552 functions as a support for the cathode 550. In other respects, the discharge device of FIG. 19 is similar to the discharge device shown in FIG. 17 and described above.

Figure 18:
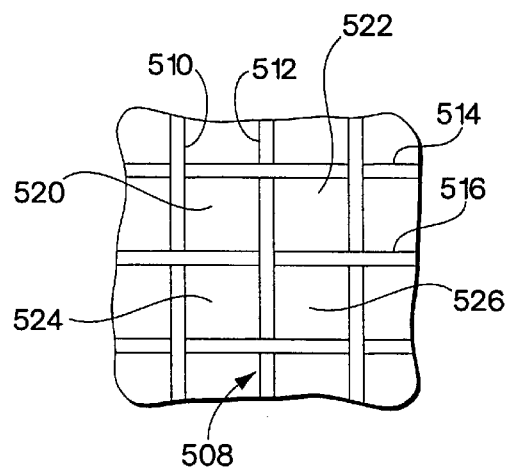
FIG. 18 is a partial illustration of the mesh cathode of FIG. 17.

The flat light sources of FIGS. 17–19 may have a thickness on the order of one millimeter. As noted above, the light sources shown in FIGS. 17–19 may be flat or may have a desired curvature.

Generally, the devices of the present invention can be operated in the low glow mode and the high glow mode as described above. However, only the low glow mode promises long lifetimes and operation determined by the fill gas. In the high glow mode, the lifetime is limited, and the electrode vapor determines the characteristic of the discharge. This may be desirable when metal vapor radiation is required.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A light source comprising:
    a sealed discharge chamber containing a gas at a prescribed pressure;
    a cathode mounted within said discharge chamber, said cathode comprising a conductor that defines an array of micro hollows, each of said micro hollows having a cross-sectional dimension selected to support a micro hollow discharge at said prescribed pressure and having an axial dimension that is substantially less than said cross-sectional dimension;
    an anode spaced from said cathode; and
    electrical means for coupling electrical energy to said cathode and said anode at a voltage and current for producing micro hollow discharges in each of the micro hollows in said cathode.

2. A light source as defined in claim 1 wherein said cathode comprises a wire mesh including spaced-apart conductors which define said micro hollows.

3. A light source as defined in claim 1 wherein said discharge chamber includes a light-transmissive portion for transmission of light generated in said micro hollows.

4. A light source as defined in claim 3 wherein said cathode is located between the light-transmissive portion of said discharge chamber and said anode.

5. A light source as defined in claim 4 further including a phosphor coating on the light-transmissive portion of said discharge chamber, said phosphor coating emitting radiation having a prescribed spectrum in response to radiation generated within said micro hollows.

6. A light source as defined in claim 2 wherein said wire mesh comprises a grid of spaced-apart conductors having spacings of about 200 micrometers and diameters of about 40 micrometers.

7. A light source as defined in claim 1 wherein said cathode comprises a conductive pattern formed on a light-transmissive substrate, said conductive pattern comprising a grid of spaced-apart conductive lines.

8. A light source as defined in claim 1 wherein said discharge chamber has a thin, flat configuration, thereby defining a flat light source.

9. A light source as defined in claim 1 wherein said prescribed pressure is in a range of about 10 to 500 torr.

10. A light source comprising:

a sealed discharge chamber containing a gas at a prescribed pressure, said discharge chamber including a flat, light-transmissive wall and a metal wall spaced from and parallel to said light-transmissive wall, said metal wall comprising an anode;

a cathode mounted within said discharge chamber between said light-transmissive wall and said metal wall, said cathode comprising a conductor that defines an array of micro hollows, each of said micro hollows having a cross-sectional dimension selected to support a micro hollow discharge at said prescribed pressure and having an axial dimension that is substantially less than said cross-sectional dimension; and electrical means for coupling electrical energy to said cathode and said anode at a voltage and current for producing micro hollow discharges in each of the micro hollows in said cathode.

11. A light source as defined in claim 10 wherein said cathode comprises a wire mesh including a grid of spaced-apart electrical conductors which define said micro hollows.

* * * * *